United States Patent
Stuart et al.

(10) Patent No.: US 10,271,020 B2
(45) Date of Patent: Apr. 23, 2019

(54) IMAGING SYSTEM EMPLOYING FIXED, MODULAR MOBILE, AND PORTABLE INFRARED CAMERAS WITH ABILITY TO RECEIVE, COMMUNICATE, AND DISPLAY DATA AND IMAGES WITH PROXIMITY DETECTION

(71) Applicant: Fluke Corporation, Everett, WA (US)

(72) Inventors: Michael D. Stuart, Issaquah, WA (US); Michael A. Schoch, Granite Falls, WA (US)

(73) Assignee: Fluke Corporation, Everett, WA (US)

( * ) Notice: Subject to any disclaimer, the term of this patent is extended or adjusted under 35 U.S.C. 154(b) by 25 days.

(21) Appl. No.: 14/921,128

(22) Filed: Oct. 23, 2015

(65) Prior Publication Data
US 2016/0119592 A1  Apr. 28, 2016

Related U.S. Application Data

(60) Provisional application No. 62/068,392, filed on Oct. 24, 2014.

(51) Int. Cl.
*H04N 7/18* (2006.01)
*H04Q 9/00* (2006.01)
(Continued)

(52) U.S. Cl.
CPC .............. *H04N 7/185* (2013.01); *H04N 5/33* (2013.01); *H04Q 9/00* (2013.01); *G08C 2201/93* (2013.01);
(Continued)

(58) Field of Classification Search
None
See application file for complete search history.

(56) References Cited

U.S. PATENT DOCUMENTS

| 4,467,279 A | 8/1984 | MacCormack |
| 4,954,094 A | 9/1990 | Humphrey |

(Continued)

FOREIGN PATENT DOCUMENTS

| CN | 1548967 A | 11/2004 |
| CN | 101617238 A | 12/2009 |

(Continued)

OTHER PUBLICATIONS

U.S. Appl. No. 14/310,914, entitled Laser Illuminated Gas Imaging, filed Jun. 20, 2014, 48 pages.

(Continued)

*Primary Examiner* — Reza Aghevli
(74) *Attorney, Agent, or Firm* — Fredrikson & Byron, P.A.

(57) ABSTRACT

Systems can include a tool configured to generate a first set of data representative of an object and a control station configured to receive the first set of data from the tool. A mobile device in communication with the control station can receive data from the control station including information regarding the object based on the data received from the tool. A user of the mobile device, such as a technician, can travel to the location of the tool, and, when the mobile device is within a predetermined proximity of the tool, the tool can communicate directly with the mobile device. The technician can use the mobile device to communicate with and control the tool in order to safely perform equipment analysis.

34 Claims, 12 Drawing Sheets

(51) Int. Cl.
*H04N 5/33* (2006.01)
*H04M 1/72* (2006.01)
*H04M 1/725* (2006.01)
*H04N 5/225* (2006.01)

(52) U.S. Cl.
CPC ... *H04M 1/7253* (2013.01); *H04N 2005/2255* (2013.01); *H04Q 2209/40* (2013.01); *H04Q 2209/50* (2013.01); *H04Q 2209/823* (2013.01)

(56) References Cited

U.S. PATENT DOCUMENTS

| | | |
|---|---|---|
| 5,500,786 A | 3/1996 | Ono |
| 5,844,719 A | 12/1998 | Wada |
| 6,095,682 A | 8/2000 | Hollander et al. |
| 7,535,002 B2 | 5/2009 | Johnson et al. |
| 7,810,001 B2 | 10/2010 | Zhou et al. |
| 7,851,758 B1 | 12/2010 | Scanlon et al. |
| 7,994,480 B2 | 8/2011 | Johnson et al. |
| 8,097,857 B2 | 1/2012 | Cochran et al. |
| 8,186,873 B1 | 5/2012 | Madding |
| 8,186,876 B2 | 5/2012 | Mullin et al. |
| 8,208,026 B2 | 6/2012 | Hogasten et al. |
| 8,274,273 B2 | 9/2012 | Nguyen et al. |
| 8,289,372 B2 | 10/2012 | Hamrelius et al. |
| 8,374,438 B1 | 2/2013 | Wagner |
| 8,520,970 B2 | 8/2013 | Strandemar |
| 8,620,841 B1* | 12/2013 | Filson ............... H04L 12/1895 706/12 |
| 8,749,635 B2 | 6/2014 | Hogasten et al. |
| 8,803,698 B1 | 8/2014 | Heydron |
| 9,058,653 B1 | 6/2015 | Kostrzewa et al. |
| 9,143,703 B2 | 9/2015 | Boulanger et al. |
| 9,235,023 B2 | 1/2016 | Burt et al. |
| 9,264,154 B1 | 2/2016 | Laun |
| 9,464,984 B2* | 10/2016 | Schmidt ............ G01N 21/3504 |
| 9,473,681 B2 | 10/2016 | Hoelter et al. |
| 9,509,924 B2 | 11/2016 | Terre et al. |
| 9,568,368 B2* | 2/2017 | Bohn ..................... G01J 5/02 |
| 2002/0001032 A1 | 1/2002 | Ohki |
| 2002/0038205 A1 | 3/2002 | Gray et al. |
| 2003/0089183 A1* | 5/2003 | Jacobsen ............ G01N 29/045 73/865.8 |
| 2004/0004482 A1 | 1/2004 | Bouabdo et al. |
| 2004/0030524 A1 | 2/2004 | Jarrell et al. |
| 2004/0190586 A1 | 9/2004 | Lee |
| 2005/0107976 A1 | 5/2005 | Klijn et al. |
| 2005/0188290 A1 | 8/2005 | Motika et al. |
| 2005/0259715 A1 | 11/2005 | Lee et al. |
| 2005/0279172 A1 | 12/2005 | Schreier et al. |
| 2006/0012385 A1 | 1/2006 | Tsao et al. |
| 2006/0017821 A1 | 1/2006 | Garvey et al. |
| 2006/0043296 A1 | 3/2006 | Mian et al. |
| 2006/0046793 A1 | 3/2006 | Hamilton et al. |
| 2006/0066325 A1 | 3/2006 | McGinnis et al. |
| 2006/0150724 A1* | 7/2006 | Byrne ................. G01M 17/027 73/146 |
| 2006/0282736 A1 | 12/2006 | Schroth et al. |
| 2007/0058164 A1 | 3/2007 | Shibata et al. |
| 2007/0087311 A1 | 4/2007 | Garvey et al. |
| 2007/0198226 A1 | 8/2007 | Lee |
| 2008/0026647 A1 | 1/2008 | Boehnlein et al. |
| 2008/0091470 A1* | 4/2008 | Muradia .............. G06F 19/3418 705/3 |
| 2008/0100253 A1 | 5/2008 | Kiyamura |
| 2008/0204034 A1 | 8/2008 | Blades |
| 2008/0295582 A1 | 12/2008 | Lee et al. |
| 2009/0097502 A1* | 4/2009 | Yamamoto .......... G05B 19/4185 370/466 |
| 2009/0141137 A1 | 6/2009 | Watanabe et al. |
| 2009/0158849 A1 | 6/2009 | Gregg et al. |
| 2009/0184244 A1 | 7/2009 | Drews et al. |
| 2009/0294666 A1 | 12/2009 | Hargel |
| 2010/0097057 A1 | 4/2010 | Karpen |
| 2010/0117885 A1 | 5/2010 | Holbrook et al. |
| 2010/0130838 A1 | 5/2010 | Kermani et al. |
| 2010/0148759 A1 | 6/2010 | Lagerberg et al. |
| 2010/0163730 A1 | 7/2010 | Schmidt et al. |
| 2010/0164527 A1 | 7/2010 | Weyh et al. |
| 2010/0225299 A1 | 9/2010 | Nguyen et al. |
| 2010/0240317 A1 | 9/2010 | Giles et al. |
| 2011/0018987 A1 | 1/2011 | Doi |
| 2011/0096148 A1 | 4/2011 | Stratmann |
| 2011/0096168 A1* | 4/2011 | Siann .................... H04N 7/183 348/158 |
| 2011/0112701 A1* | 5/2011 | Johnson ................ G01D 4/002 700/295 |
| 2011/0154999 A1 | 6/2011 | Schoch |
| 2011/0185048 A1 | 7/2011 | Yew et al. |
| 2011/0239794 A1 | 10/2011 | Krapf et al. |
| 2011/0273556 A1 | 11/2011 | Lyons et al. |
| 2012/0001768 A1 | 1/2012 | Radosavljevic et al. |
| 2012/0019281 A1 | 1/2012 | Barbour, II |
| 2012/0038458 A1 | 2/2012 | Toepke et al. |
| 2012/0038760 A1 | 2/2012 | Kantzes et al. |
| 2012/0154172 A1 | 6/2012 | O'Hara et al. |
| 2012/0206129 A1 | 8/2012 | Mahan et al. |
| 2012/0244290 A1 | 9/2012 | Mullin et al. |
| 2012/0276867 A1* | 11/2012 | McNamee .......... H04L 12/1407 455/406 |
| 2012/0314086 A1 | 12/2012 | Hubel et al. |
| 2012/0320189 A1 | 12/2012 | Stuart et al. |
| 2013/0006570 A1 | 1/2013 | Kaplan |
| 2013/0010287 A1 | 1/2013 | Tutton et al. |
| 2013/0028477 A1 | 1/2013 | Schmieder et al. |
| 2013/0078908 A1* | 3/2013 | Smith .................... H04B 7/155 455/11.1 |
| 2013/0155249 A1 | 6/2013 | Neeley et al. |
| 2013/0176418 A1 | 7/2013 | Pandey et al. |
| 2013/0188058 A1 | 7/2013 | Nguyen et al. |
| 2013/0250102 A1 | 9/2013 | Scanlon et al. |
| 2013/0253551 A1 | 9/2013 | Boyle et al. |
| 2013/0278264 A1 | 10/2013 | Boskamp |
| 2013/0278771 A1 | 10/2013 | Magoun et al. |
| 2013/0286408 A1 | 10/2013 | Castillo et al. |
| 2013/0321621 A1 | 12/2013 | Menzel |
| 2013/0321641 A1 | 12/2013 | McManus et al. |
| 2013/0342680 A1 | 12/2013 | Zeng et al. |
| 2014/0002639 A1 | 1/2014 | Cheben et al. |
| 2014/0036068 A1 | 2/2014 | Nguyen et al. |
| 2014/0042319 A1 | 2/2014 | Pickett et al. |
| 2014/0058797 A1* | 2/2014 | Roy ..................... G06Q 10/08 705/7.36 |
| 2014/0062496 A1 | 3/2014 | Kwon et al. |
| 2014/0085459 A1 | 3/2014 | Blanton et al. |
| 2014/0104415 A1 | 4/2014 | Fox et al. |
| 2014/0119213 A1* | 5/2014 | Devarasetty .......... H04L 5/0091 370/252 |
| 2014/0176725 A1 | 6/2014 | Stuart et al. |
| 2014/0184810 A1 | 7/2014 | Sekiguchi |
| 2014/0219314 A1 | 8/2014 | Ryou |
| 2014/0253735 A1 | 9/2014 | Fox et al. |
| 2014/0266765 A1* | 9/2014 | Neeley .................. G01D 7/08 340/691.6 |
| 2014/0267753 A1 | 9/2014 | Epperson et al. |
| 2014/0267757 A1 | 9/2014 | Abramson et al. |
| 2014/0270546 A1 | 9/2014 | Neeley et al. |
| 2014/0278259 A1 | 9/2014 | Neeley et al. |
| 2014/0313325 A1 | 10/2014 | Buehler et al. |
| 2014/0327735 A1 | 11/2014 | Ruchet et al. |
| 2015/0054492 A1 | 2/2015 | Mende et al. |
| 2015/0063652 A1 | 3/2015 | Mangan et al. |
| 2015/0170110 A1* | 6/2015 | Schluessel .......... G06Q 10/20 702/184 |
| 2015/0185251 A1 | 7/2015 | Heydron et al. |
| 2015/0269742 A1 | 9/2015 | Bergstrom et al. |
| 2015/0334225 A1* | 11/2015 | Bull ..................... H04B 3/46 379/22.07 |
| 2015/0365598 A1 | 12/2015 | Tanaka et al. |
| 2016/0076936 A1* | 3/2016 | Schoch ................ G01J 1/4228 250/349 |
| 2016/0076937 A1* | 3/2016 | Stuart .................... G06F 1/163 250/349 |

(56) References Cited

U.S. PATENT DOCUMENTS

| | | | |
|---|---|---|---|
| 2016/0080666 A1* | 3/2016 | Stuart | H04N 5/332 348/135 |
| 2016/0080667 A1* | 3/2016 | Stuart | H04N 5/332 348/135 |
| 2016/0105810 A1* | 4/2016 | Khurana | H04W 24/06 370/252 |
| 2016/0105811 A1* | 4/2016 | Khurana | H04W 24/06 370/252 |
| 2016/0116309 A1 | 4/2016 | Silva et al. | |
| 2016/0119592 A1* | 4/2016 | Stuart | H04Q 9/00 348/82 |
| 2016/0131607 A1* | 5/2016 | Silva | G01N 21/3563 324/721 |
| 2016/0173743 A1 | 6/2016 | Masarik | |
| 2016/0223588 A1 | 8/2016 | Fox | |
| 2016/0290869 A1 | 10/2016 | Frank et al. | |
| 2017/0024871 A1* | 1/2017 | Schmidt | G01N 21/3504 |
| 2017/0061663 A1 | 3/2017 | Johnson et al. | |
| 2017/0078544 A1 | 3/2017 | Ringsrud et al. | |
| 2017/0078545 A1 | 3/2017 | Kearsley et al. | |
| 2017/0111258 A1* | 4/2017 | Bezold | H04L 43/50 |
| 2017/0116725 A1* | 4/2017 | Stuart | G06T 7/0004 |
| 2017/0140520 A1* | 5/2017 | Stuart | G06T 7/0004 |

FOREIGN PATENT DOCUMENTS

| | | |
|---|---|---|
| CN | 101672864 A | 3/2010 |
| CN | 103606276 A | 2/2014 |
| CN | 103760448 A | 4/2014 |
| DE | 102004007314 A1 | 8/2005 |
| EP | 2230605 A1 | 9/2010 |
| EP | 2570879 A2 | 3/2013 |
| EP | 2683146 A1 | 1/2014 |
| EP | 2684731 A1 | 1/2014 |
| EP | 2778628 A2 | 9/2014 |
| JP | 2008232637 A | 10/2008 |
| WO | 2011131758 A1 | 10/2011 |
| WO | 2012170941 A1 | 12/2012 |
| WO | 2012170946 A2 | 12/2012 |
| WO | 2012170949 A2 | 12/2012 |
| WO | 2012170953 A2 | 12/2012 |
| WO | 2012170954 A2 | 12/2012 |
| WO | 2013052196 A1 | 4/2013 |
| WO | 2013052383 A1 | 4/2013 |
| WO | 2014012070 A1 | 1/2014 |
| WO | 2014043592 A2 | 3/2014 |
| WO | 2014082097 A1 | 5/2014 |
| WO | 2014085699 A1 | 6/2014 |
| WO | 2014093721 A2 | 6/2014 |
| WO | 2014093724 A1 | 6/2014 |
| WO | 2014170306 A1 | 10/2014 |

OTHER PUBLICATIONS

U.S. Appl. No. 62/219,415, entitled Systems and Methods for Placing an Imaging Tool in a Test and Measurement Tool, filed Sep. 16, 2015, 26 pages.

U.S. Appl. No. 14/855,844, entitled "Method of Attaching Camera or Imaging Sensor to Test and Measurement Tools," filed Sep. 16, 2015, 29 pages.

U.S. Appl. No. 14/856,046, entitled Triggered Operation and/or Recording of Test and Measurement or Imaging Tools, filed Sep. 16, 2015, 42 pages.

U.S. Appl. No. 14/855,989, entitled "Display of Images From an Imaging Tool Embedded or Attached to a Test and Measurement Tool," filed Sep. 16, 2015, 30 pages.

U.S. Appl. No. 14/855,864, entitled "Mobile Device Used With Isolated Test and Measurement Input Block," filed Sep. 16, 2015, 28 pages.

U.S. Appl. No. 14/855,884, entitled "Test and Measurement System With Removable Imaging Tool," filed Sep. 16, 2015, 30 pages.

U.S. Appl. No. 62/245,351, entitled Use of Infrared Camera and Vibration Analysis, filed Oct. 23, 2015, 15 pages.

1587 FC/1587/1577 Insulation Multimeter, User's Manual, Apr. 2005, 50 pages.

Fluke 3000 FC Series Test Tools Fluke, Mar. 31, 2014, Retrieved from URL: http://www.mouser.com/catalog/specsheets/Fluke; 12 pages.

Fluke Connect TM Wi-Fi Connection to Thermal Imager, May 31, 2014, Retrieved from URL: http://www.bergeng.com/mm5/downloads/fluke/FC_ti90_qreng000.pdf; 2 pages.

Son et al., "Vibration displacement measurement technology for cylindrical structures using camera images," Nuclear Engineering and Technology, vol. 47, No. 4, Mar. 27, 2015, pp. 488-499.

Ti125, Ti110, Ti105, Ti100, Ti95, and Ti90 Industrial-Commercial Imagers, May 31, 2014, Retrieved from URL: http://www.farnell.com/datasheets/1829789.pdf; 4 pages.

U.S. Appl. No. 15/190,792, filed Jun. 23, 2016, and entitled Thermal Anomaly Detection, 61 pages.

International Search Report for PCT/US2015/057115, dated Feb. 9, 2016, 16 pages.

Fluke Corporation, "Measuring from a Safe Distance from the Fluke Connect app," 1 page, May 12, 2014, URL:https://www.youtube.com/wach.

Li et al., "A Machine Vision Method for the Measurement of Vibration Amplitude," Meas. Sci. Technol., vol. 18, 2007, 11 pages.

Guoxiong et al., "Measurement and Control Circuit," China Machine Press, Version 3, Mar. 2008, Section 2.3, with partial English translation, 6 pages.

* cited by examiner

ND PORTABLE
IMAGING SYSTEM EMPLOYING FIXED, MODULAR MOBILE, AND PORTABLE INFRARED CAMERAS WITH ABILITY TO RECEIVE, COMMUNICATE, AND DISPLAY DATA AND IMAGES WITH PROXIMITY DETECTION

CROSS-REFERENCES

This application claims the benefit of U.S. Provisional Application No. 62/068,392, filed Oct. 24, 2014, and entitled "IMAGING SYSTEM EMPLOYING FIXED, MODULAR MOBILE, AND PORTABLE INFRARED CAMERAS WITH ABILITY TO RECEIVE, COMMUNICATE, AND DISPLAY DATA AND IMAGES WITH PROXIMITY DETECTION," which is assigned to the assignee of the instant application, and which is hereby incorporated by reference in its entirety.

BACKGROUND

Monitoring and analysis of equipment can be crucial for performing preventative maintenance, troubleshooting problems, or providing service to equipment. However, routine monitoring and analysis can be difficult due to a large number of pieces of equipment, remote locations of equipment, inaccessibility if equipment, and the like. In some instances, equipment may be located in a hard-to-reach area in which direct equipment observation may be inconvenient or dangerous. For example, electrical or mechanical equipment may be operating within an enclosure that is unsafe for a technician to open without shutting down the equipment, which can be inefficient and costly. In other examples, equipment may be too dangerous for a technician to approach and analyze during operation. In still further examples, equipment may be located in a hazardous environment, which can limit access to the equipment by a technician. Accordingly, in such systems, it can be inefficient, costly, and/or dangerous to perform analysis or maintenance on equipment.

SUMMARY

Aspects of the disclosure are directed toward systems and methods for monitoring equipment, such as equipment in a hard-to-reach or inaccessible area. In some embodiments, systems include a tool positioned proximate an object under test. The tool can be configured to generate data representative of one or more characteristics of the object under test. In various embodiments, the tool can be configured to generate image data, measurement data, or a combination thereof.

Exemplary systems can include a mobile device configured to receive a first set of data associated with data generated by the tool. The first set of data can include location data representative of the location of the tool and/or the object under test. In some examples, the first set of data can also include a signal representative of one or more characteristics of the object under test. The mobile device and tool can be configured such that, when the mobile device is brought to within a predetermined proximity of the tool, the mobile device receives a second set of data from the tool. The second set of data can include image data and/or measurement data generated by the tool, or other data. Communication between the mobile device and the tool permits a technician operating the mobile device to interface with the tool to analyze the object under test without requiring the technician to access the object directly.

Some systems can include a control center configured to facilitate communication of data to the mobile device. For example, in some embodiments, the tool is in communication with a control station at a control center. The tool can communicate data to the control center such as image data, measurement data, alarm data corresponding to a detected condition, and the like. The control station can communicate with the mobile device to inform the technician of a status of the object under test, such as a satisfied alarm condition. The data communicated from the control station to the mobile device can be the same or different from the data communicated from the tool to the control station.

In some examples, a control station can be in communication with a plurality of tools located at a plurality of locations. The control station can receive location data from the tool in addition to data representative of a characteristic of the associated object under test. In the event that an object requires further analysis by a technician, the control station can communicate information including the location information associated with that object. Thus, even in a system including a plurality of objects at different locations, a technician can travel to the location of the object requiring attention. Once at the location, the technician can communicate with the tool associated with the object without requiring direct access to the object.

DETAILED DESCRIPTION

Embodiments of the invention generally relate to a test and measurement system including at least one test and measurement tool and at least one imaging tool. The at least one test and measurement tool can include the ability to measure or otherwise determine a characteristic of an object under test. Exemplary test and measurement tools can include, but are not limited to, digital multimeters, current measurement tools, power quality tools, vibration tools, portable oscilloscope tools, laser alignment tools, ultrasonic test tools, insulation resistance testers, multi-function electrical test tools, single-function electrical test tools, contact temperature measurement tools, humidity measurement tools, air-flow measurement tools, air temperature measurement tools, air quality and particulate measurement tools.

Various test and measurement tools can be configured to perform one or more primary functions. In some examples, the primary function of a test and measurement tool can include performing a primary measurement. For instance, a primary function of some current measurement tools can include measuring an electrical current. It will be appreciated that a test and measurement tool may have more than one primary function. For example, a digital multimeter (DMM) may include several primary functions, such as measuring current, voltage, and resistance, for example.

Figure 1:
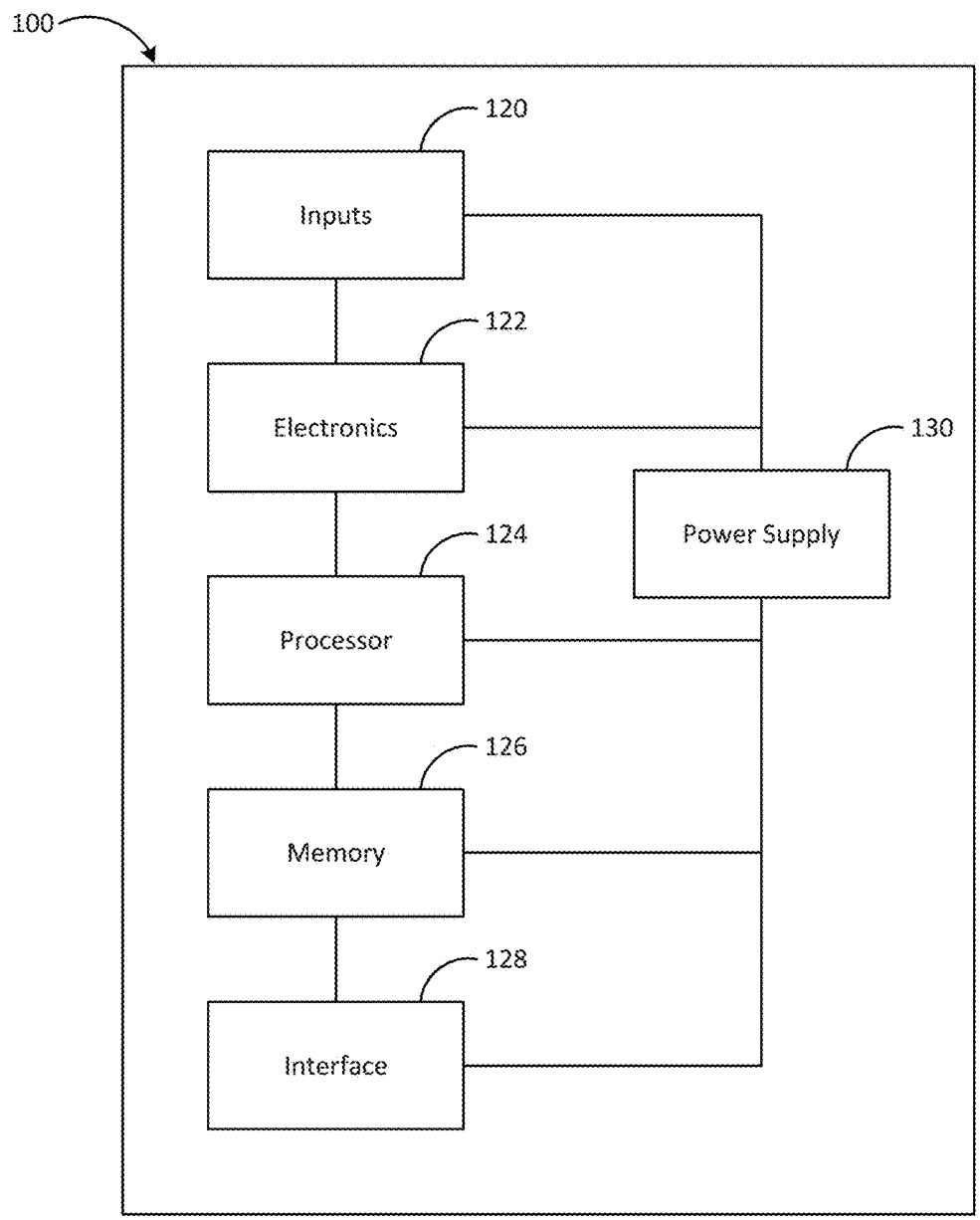
FIG. 1 is an exemplary schematic diagram of a test and measurement tool comprising a variety of components.

FIG. 1 is an exemplary schematic diagram of a test and measurement tool comprising a variety of components. In the illustrated example, the test and measurement tool 100 may include one or power supplies 130 for providing electrical power to any of a variety of system components for performing a variety of tasks, such a performing one or more primary functions. In some embodiments, the one or more power supplies 130 may include one or more batteries. Additionally or alternatively, the test and measurement tool 100 may be capable of running on AC power, e.g., from a standard wall receptacle. In some such embodiments, one or more batteries of the test and measurement tool 100 may be charged while the tool 100 is operating on or otherwise plugged into an AC power source. In some examples, the test and measurement tool may additionally or alternatively be powered via a parasitic power supply, such as inductive or direct in-line supplies proximate other powered devices.

The test and measurement tool may include one or more inputs 120 configured to interface with an object under test for performing a measurement of a parameter thereof. In various examples, the one or more inputs 120 may include any appropriate input for performing a measurement of a parameter of a device under test. The one or more inputs 120 may provide a signal indicative the parameter of the object under test to any combination of electronics 122 and a processor 124 for further processing of the signal. In some examples, the test and measurement tool 100 includes a memory 126 for storing information indicative of one or more parameters of a device under test. In some embodiments, one or both of processor 124 and memory 126 may be integrated into electronics 122.

In some embodiments, test and measurement tool 100 may include an interface 128 for interacting with a user. In some examples, interface 128 may include one or more controls for receiving user inputs. Controls may include, for example, buttons, switches, knobs, touch screens, etc. In some embodiments, a user may initiate a measurement or other test and measurement tool 100 function using controls. Additionally or alternatively, the interface may include a display for communicating information to a user. For example, the display may present a user with selectable options, such as various functions selectable by the user via controls. Additionally or alternatively, the display may be configured to present the results of one or more measurements performed by the test and measurement tool for observation by a user. In some examples, a display is capable of presenting textual measurement information (e.g., letters, numbers, etc.), but is not capable of displaying image information, such as described elsewhere herein. Additionally or alternatively, in some embodiments, power supply 130 is not capable of supporting a continuous image display without severely depleting the available power supply. Thus, in some examples, presentation of image data via interface 128 may be impossible or impractical.

In some examples, interface 128 may provide an interface with additional equipment. For example, in some embodiments, interface 128 can provide a communication interface between the test and measurement tool 100 and an imaging tool (e.g., 110) or an external device (e.g., smartphone, tablet, etc.). In various embodiments, interface 128 can be used to export received measurement data, such as from inputs 120, or a processed result, for example, from processor 124.

In various embodiments, the imaging tool can be integrated into the test and measurement tool, can be removably attached to the test and measurement tool, or can be separate from the test and measurement tool. Imaging tools that are separate or separable from a test and measurement tool can be in communication with the test and measurement tool, for example, as described in U.S. patent application Ser. No. 14/855,884, filed Sep. 16, 2015, and entitled "TEST AND MEASUREMENT SYSTEM WITH REMOVABLE IMAGING TOOL," which is assigned to the assignee of the instant application, and which is hereby incorporated by reference in its entirety. An imaging tool can include one or more cameras, sensors, or other optical component capable of receiving electromagnetic radiation and generating electrical signals representative of the received radiation. Portions of the imaging tool may be sensitive to one or more wavelengths or wavelength bands. For example, in some embodiments, the portions of the imaging tool can be capable of detecting any combination of visible light (VL), near infrared (NIR), short-wavelength infrared (SWIR), long-wavelength infrared (LWIR), terahertz (THz), ultraviolet (UV), X-ray, or other wavelengths.

In various examples, the imaging tool can include one or more imaging devices capable of generating image data of a particular range of wavelengths. In some examples, the one or more imaging devices are configured to generate image data representative of at least partially overlapping target scenes. The imaging tool can include one or more cameras (e.g., an infrared (IR) camera and a VL camera) for capturing a plurality of images of substantially the same or overlapping scenes.

Figure 2:
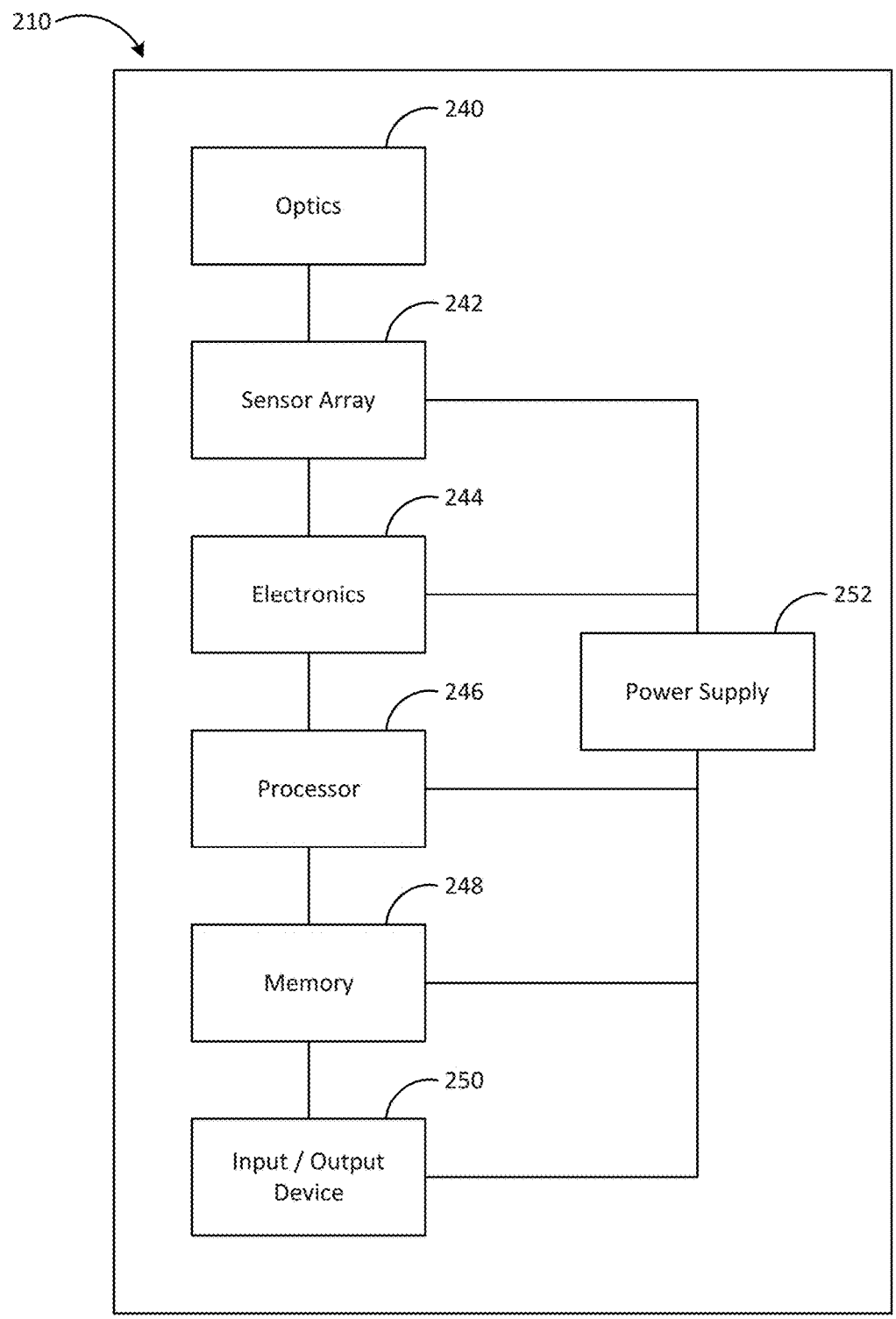
FIG. 2 shows an example block diagram of an imaging tool configured for receiving electromagnetic radiation according to some exemplary systems.

Imaging tools can be used to acquire image data representative of a target scene. For example, in some configurations, one or more imaging tools can be positioned to acquire image data representative of the device under test by the test and measurement tool. FIG. 2 shows an example block diagram of an imaging tool configured for receiving electromagnetic radiation according to some exemplary systems. In the illustrated embodiment, imaging tool 210 includes optics 240, a sensor array 242, electronics 244, one or more processors 246, memory units 248, input/output devices 250, and a power supply 252.

The optics 240 can include optics for focusing, deflecting, and/or reflecting electromagnetic radiation from a target object onto the sensor array 242. In some examples, the sensor array 242 may include an infrared sensor array sensitive to infrared radiation. An imaging tool including such an infrared sensor array may be used to make non-contact temperature measurements.

In such embodiments, the infrared sensor array 242 can include one or more thermal detectors such as microbolometers or thermopiles, or could be composed of photon detectors such as photodiodes or phototransistors, or other thermal or photon detection device. In some examples, an infrared sensor array may include a single detector, for instance, for determining a spot temperature within a target scene. Alternatively, an infrared sensor array may comprise a plurality of such detectors for acquiring at least one of a spot temperature (e.g., via an average value of sensor array sensors) or a two-dimensional infrared image.

One of skill in the art will recognize that various sensor arrays (e.g. photon sensor arrays) can be used, and can be used in combination with one or more infrared sensor arrays. In some examples, the sensor array is fixed within the imaging tool 210 to provide a more durable device having fewer moving and moveable parts. In various examples, the size and positioning of the detector depends on the characteristics of the optical system (e.g., the relationship between optics 240 and sensor array 242). In some embodiments, the detector is generally circular having a diameter of 0.5 mm to 2 mm. However detectors of any size and shape should be considered within the scope of the invention. The detector produces a signal as a function of the radiation or other scene data imaged thereupon. These signals can be processed by known methods to indicate a temperature or other metric indicated via the received radiation.

A person of skill in the art will recognize that many materials and materials technologies may be suitable for use in an infrared sensor array. In some examples, the infrared sensor array 242 responds to infrared radiation ranging from approximately 0.7 microns to approximately 20 microns and can have a peak sensitivity within this range. The electronics 244 receive the output signals from the sensor array 242 and pass them to the processor 246 for analysis.

When an infrared sensor assembly is used, the processor 246 can be used to run infrared thermometer applications including, but not limited to, deciding if the target object sufficiently fills the field of view, and averaging output signals for a period of time to reduce the impact of noisy measurements on the accuracy of the measured temperature. In the case of alternative sensor arrays (e.g., sensitive to one or more of visible light, ultraviolet light, X-rays, etc.), the processor 246 may be used to run corresponding imaging applications.

Memory 248 can include but is not limited to, RAM, ROM, and any combination of volatile and non-volatile memory. A power supply 252 can include, but is not limited to, a battery, a parasitic energy system (e.g., an inductive system), and components for directly receiving AC power. The power supply 252 can provide power to the sensor array 242, electronics 244, processor 246, memory 248, and/or input/output devices 250. An input/output device 250 may include, but is not limited to, triggers to start and stop the image capture, visual displays, speakers, and communication devices that operate through wired or wireless communications.

For instance, in some examples, the input/output device 250 of the imaging tool 210 can include a display capable of displaying an image produced from data conveyed or captured by one or more sensor arrays 242. In some examples, the display can be further configured to show other data, such as data from the test and measurement tool or other external sources. As discussed elsewhere herein, in some embodiments, data can be communicated between the test and measurement tool and the imaging tool such as described in U.S. patent application Ser. No. 14/855,884, which is incorporated by reference. In some embodiments, input/output device 250 may be capable of one or more of receiving measurement data from a measurement tool and communicating at least one of image data or received measurement data to an external device, such as a tablet, smartphone, computer, etc.

In some systems, communication between the imaging tool and the test and measurement tool can include external devices or remote locations to facilitate measurement. Additionally or alternatively, one or both of imaging tools and test and measurement tools can be adapted to communicate with a user's external device, which may be otherwise not necessarily capable of performing various imaging or other measurement functions. Accordingly, in some examples, any combination of imaging tools and test and measurement tools can interface with an external device as described in U.S. patent application Ser. No. 14/855,864, filed Sep. 16, 2015, and entitled "MOBILE DEVICE USED WITH ISOLATED TEST AND MEASUREMENT INPUT BLOCK," which is assigned to the assignee of the instant application, and which is hereby incorporated by reference in its entirety. Similarly, an imaging tool can include an input block or input jack to permit functionality typically found in a test and measurement tool to be performed by the imaging tool.

Accordingly, in some embodiments, the imaging tool can acquire image data (e.g., IR image data) and communicate image data to the test and measurement tool. In some examples, the image data communicated by the imaging tool to the test and measurement tool can include raw image data for analysis. In other examples, the imaging tool can perform analysis on the image data (e.g., perform radiometric calculations regarding IR image data), and transmit such analyzed data in addition to or alternatively to the raw image data to the test and measurement tool.

Figure 3:
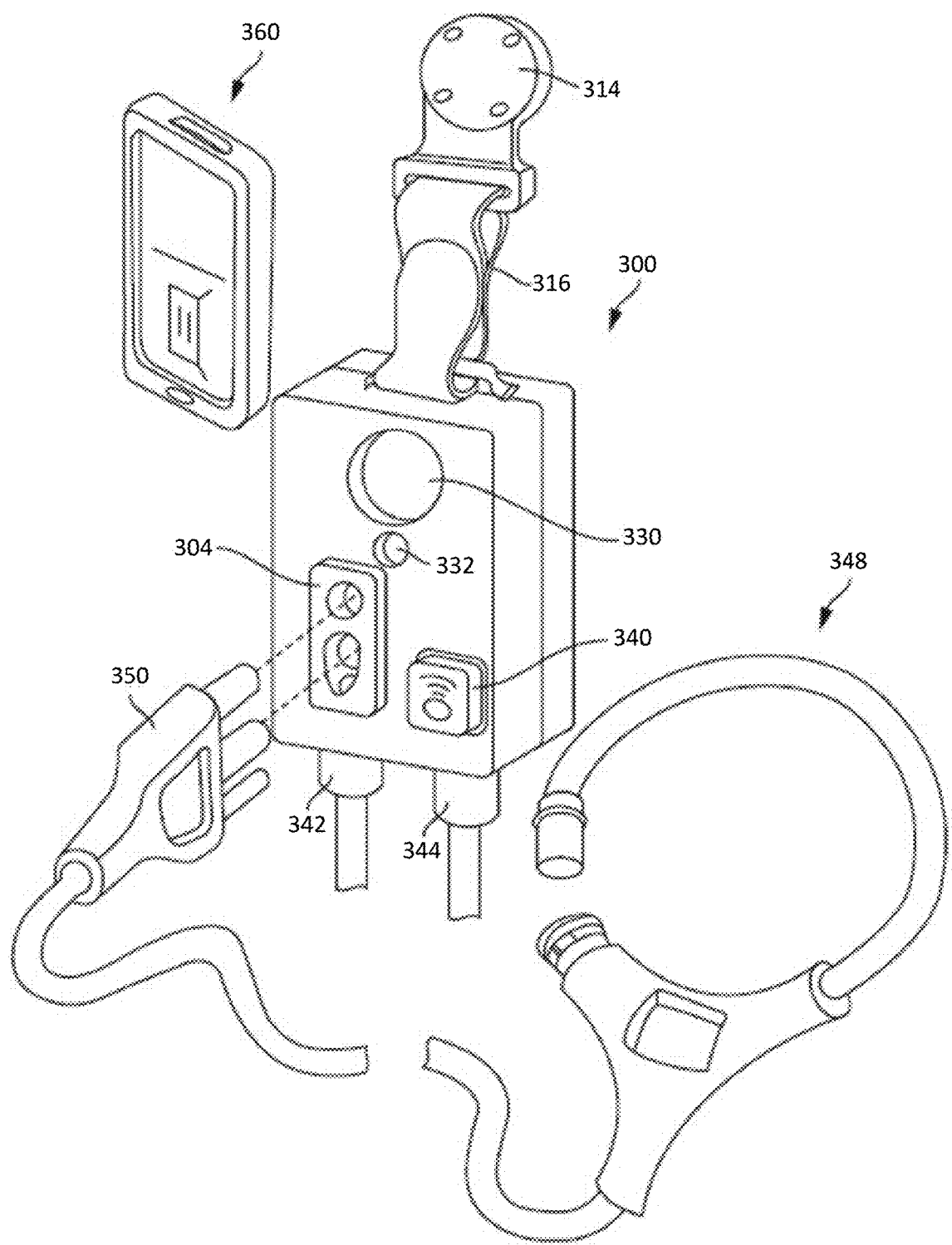
FIG. 3 illustrates an exemplary arrangement of an imaging tool and a test and measurement tool in accordance with some system embodiments.

As described, in various systems, the test and measurement tool and imaging tool can be coupled or separate from one another. In some examples, the imaging tool can be removably attached to the test and measurement tool, such as described in U.S. patent application Ser. No. 14/855,884, which is incorporated by reference. FIG. 3 illustrates an exemplary arrangement of an imaging tool and a test and measurement tool in accordance with some system embodiments. The system of FIG. 3 includes a tool 300 in communication with a measurement accessory 348. In the illustrated embodiment, tool 300 includes an interface 304 for receiving an interfacing plug 350 of the measurement accessory 348. The tool 300 can receive a signal from the measurement accessory 348 via the interface 304 and generate measurement data therefrom. For example, in the illustrated embodiment, the test and measurement accessory 348 can be configured to measure a current flowing through a conductor and communicate data to the tool 300 representative of the amount of measured current. Accordingly, tool 300 may include and/or function as a test and measurement tool generating measurement data representative of at least one parameter of a device under test. In some examples, the tool 300, the test and measurement accessory 348 or the combination of the test and measurement accessory 348 and the tool 300 may be referred to as a test and measurement tools.

The tool 300 of FIG. 3 includes an IR imaging device 330 and a VL imaging device 332 for generating IR and VL image data representative of a target scene, respectively. Thus, tool 300 may similarly function as an imaging tool. IR and VL image data can be combined and displayed in any number of ways, such as those described in U.S. Pat. No. 7,535,002, entitled "CAMERA WITH VISIBLE LIGHT AND INFRARED BLENDING," which is assigned to the assignee of the instant application, and which is hereby incorporated by reference in its entirety. Accordingly, the IR 330 and VL 332 imaging devices can acquire IR and VL image data, respectively, of a target scene. The IR and VL image data can be combined or otherwise displayed or analyzed by a user or a processing device. In some examples, the tool 300 includes a processor for performing any combination of processing IR and VL image data, processing measurement data from the measurement accessory 348, initiating one or more operations by one or more of the VL imaging device 332, the IR imaging device 330, and the measurement accessory 348 in response to received information, combining received data from any of such tools, or any other processing functions.

The tool 300 of FIG. 3 includes an attachment mechanism 314 for permanently or removably affixing the tool 300 to a surface. In some instances, a user can affix the tool 300 to a surface or structure proximate equipment under test so that the equipment under tests is in the field of view of the tool 300. The attachment mechanism 314 can include any appropriate material or construction for affixing to a surface or structure, such as a hook and loop material, a magnet, a snap, a clip, and the like. The attachment mechanism 314 can be secured to the tool 300 via a strap 316. In other embodiments, the attachment mechanism 314 can be attached directly to the tool 300.

The illustrated system of FIG. 3 includes an external device 360, which can be in wired or wireless communication with the tool 300. The external device 360 can include a smartphone, tablet, or any other external device capable of performing any of receiving, processing, or displaying data. In some examples, the tool 300 includes a button 340 for activating a wireless interface of the tool 300. In some such examples, actuating button 340 enables wireless communication between the tool 300 and an external device such as 340. In some embodiments, the button 340 can enable wireless communication between the tool 300 and a test and measurement tool, or a remote location, for example over a network. In some embodiments, wireless communication between the tool 300 and an external device 360 need not be initiated by button 340. For instance, in some examples, the tool 300 may be configured to communicate with any appropriate external device within communication range. In some examples, communication may be established automatically with an external device. In some such example, communicating is established automatically with a device running appropriate software (e.g., a smartphone or tablet application). In still further embodiments, communication may be established from the external device.

The tool 300 of FIG. 3 includes a communication link 342 for communicating or receiving data or other signals to or from other devices. For instance, in some examples, the tool 300 can interface with the external device 360 or other equipment via a wired connection to the communication link 342. In various embodiments, communication link 342 may provide for wired communication, wireless communication, or both.

The tool 300 can include a power input 344 for receiving power from a power source. For instance, the power input 344 can be coupled to an external power supply, such as a wall socket or other power supply. Additionally or alternatively, the tool 300 can include one or more batteries for powering the tool 300 or can parasitically receive power from a powered proximate device. In some examples, the power input 344 may provide electrical power to the imaging tool, the test and measurement tool, or both.

During an exemplary operation of the embodiment of FIG. 3, the tool 300 can generate measurement data regarding one or more parameters of equipment under test based on a received signal from the measurement accessory 348 via interface 304. The tool 300 can capture image data using one or both of the IR imaging device 330 or the VL imaging device 332. The tool 300 can process one or both of the image data and the measurement data to determine if any thresholds have been met. In response to any number of a variety of met thresholds or other predetermined conditions, the tool 300 can initiate one or more operations regarding one or both of the imaging device(s) 330, 332 and the measurement accessory 348 such as those described above.

In some examples, the tool 300 transmits data either wirelessly or via a wired connection (e.g., communication link 342) to a separate device, such as the external device 360 or other remote location. The separate device can analyze one or both of imaging data and measurement data, and can communicate commands back to the tool 300 in response to one or more satisfied thresholds or predetermined conditions. Additionally or alternatively, external device 360 can receive any combination of measurement data, IR image data, and VL image data from the tool 300. Accordingly, in some examples, the external device 360 can display any combination of such data, including measurement data (e.g., the amount of current flowing through a conductor), a VL image of the target scene, an IR image of the target scene, a combination VL and IR image of the target scene, and apparent temperature data of the target scene determined from the IR image data. In general, any combination of available data can be displayed.

Figure 4:
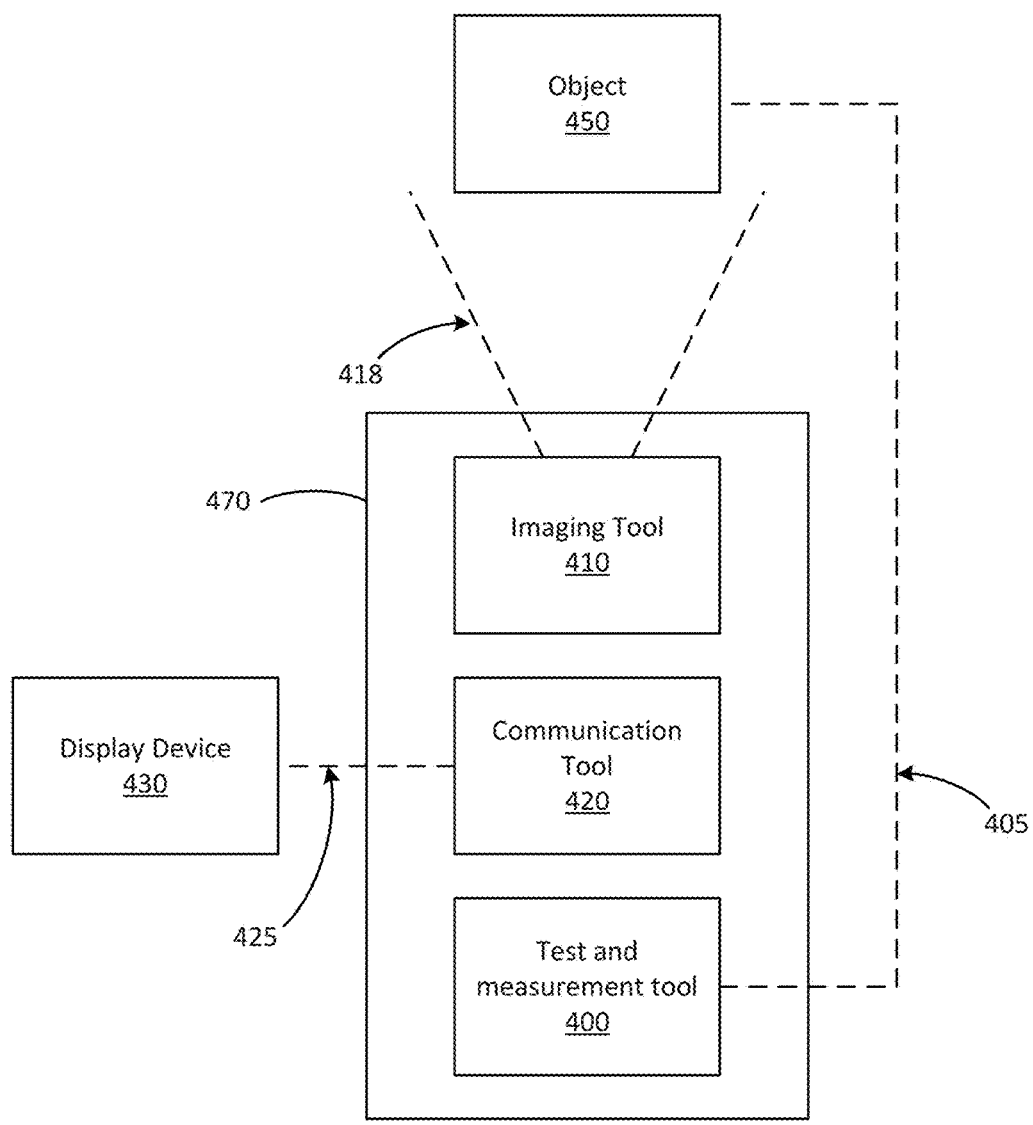
FIG. 4 is a schematic diagram illustrating exemplary operation of a system.

FIG. 4 is a schematic diagram illustrating exemplary operation of a system. In the illustrated embodiment, a combination tool 470 includes a test and measurement tool 400 and an imaging tool 410. In the illustrated configuration, test and measurement tool 400 is arranged to interface with object 450 via communication 405 to generate measurement data representative of at least one parameter of the object 450. Interfacing with object 450 via communication 405 can comprise interfacing with the object 450 via a test and measurement accessory in communication with the test and measurement tool 400. The imaging tool 410 is arranged such that object 450 is in the field of view 418 of the imaging tool 410. Imaging tool 410 can be configured to generate image data representative of the object 450. In an exemplary embodiment, imaging tool 410 includes an infrared sensor array and is configured to generate infrared image data representative of the heat pattern of object 450.

The combination tool 470 includes a communication tool 420 in communication with a display device 430 via communication link 425. Communication link 425 can include a wired (e.g., fixed or detachable wired connection) or wireless connection. Display device 430 may include an external device, such as a tablet, smartphone, computer, wearable device, or the like. During operation, the communication tool 420 may receive at least one of image data from imaging tool 410 and measurement data from test and measurement tool 400. Communication tool 420 may communicate at least one of the received image data and measurement data to the display device 430 for display. As described elsewhere herein, in some examples, data communicated to display device 430 from communication tool 420 may already be processed and suitable for display. In other examples, display device 430 may process the received data in order to generate a display.

In some examples, imaging tool 410 is fixedly integrated along with the test and measurement tool 400 to form the combination tool 470. In other examples, the imaging tool 410 may be separable from the test and measurement tool 400. In some such examples, imaging tool 410 can communicate with at least one of the test and measurement tool 400 and the display device 430 via its own communication tool (not shown). Similarly, test and measurement tool 400 may communicate information to at least one of a separable imaging tool 410 and display device 430.

As described, the display device (e.g., 430) can receive image data (e.g., IR and VL image data) and measurement data (e.g., a current measurement) and generate and present a display including any or all of the received measurement and/or image data. For example, IR and VL image data can be combined for display as in U.S. Pat. No. 7,535,002, which is incorporated by reference. Additionally or alternatively, image data and measurement data can be combined as in U.S. Patent Publication No. US20140278259, corresponding to U.S. patent application Ser. No. 14/214,600, filed Mar. 14, 2014, and entitled "CAPTURE AND ASSOCIATION OF MEASUREMENT DATA," which is assigned to the assignee of the instance application, and which is hereby incorporated by reference in its entirety. The combination of image data and measurement data can be displayed to present both image streams to the user.

Figure 5:
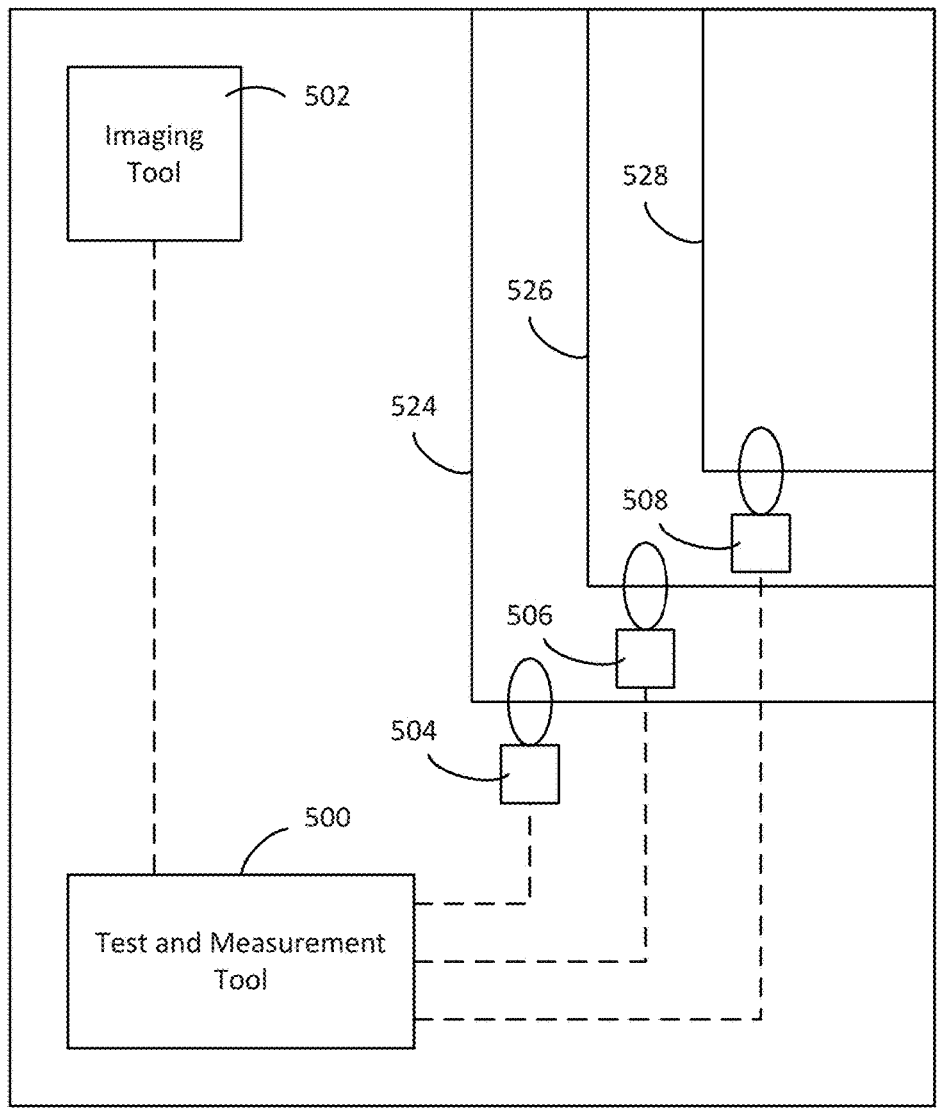
FIG. 5 is another test and measurement tool configured to receive an imaging component.

FIG. 5 shows a schematic diagram of a system including separated imaging tools and test and measurement tools. In the system of FIG. 5, a test and measurement tool 500 is in communication with interfacing devices 504, 506, 508 configured to generate measurement data (e.g., power data) from conductors 524, 526, 528, respectively. In various embodiments, interfacing devices 504, 506, 508 can be standalone devices (e.g., current clamps) in communication with the test and measurement tool 500 and configured to provide measurement data thereto via wired or wireless communication. In other embodiments, interfacing devices 504, 506, 508 can include built-in features of the test and measurement tool 500. For instance, interfacing devices 504, 506, 508 can include inputs or leads directly coupled to the test and measurement tool and arranged to perform one or more measurements related to conductors 524, 526, 528. In some examples, test and measurement tool 500 includes a single tool interfacing with each of interfacing devices 504, 506, 508. Alternatively, while illustrated as a single tool, test and measurement tool 500 can include a plurality of test and measurement tools each interfacing with a corresponding interfacing device.

As shown, the test and measurement tool 500 is in communication with the imaging tool 502. In some embodiments, the imaging tool 502 is structurally separate from the test and measurement tool 500, and communicates therewith by wired or wireless communication. During operation, imaging tool 502 can detect image data of the target scene, including parts of conductors 524, 526, 528. Image data can be analyzed by the imaging tool 502 or sent to the test and measurement tool 500 for analysis. In some embodiments, in the event analysis of the image data yields one or more predetermined outcomes, test and measurement tool 500 can initiate one or more measurements using interfacing devices 504, 506, 508. For instance, the imaging tool 502 can detect IR image data indicative of a first alarm condition, which causes the test and measurement tool 500 to perform a measurement of one or more parameters of conductors 524, 526, 528. In some examples, one or both of the imaging tool 502 and the test and measurement tool 500 can be in communication with an external or mobile device (not shown), such as described, for example, in U.S. patent application Ser. No. 14/855,989, filed Sep. 16, 2015, and entitled "DISPLAY OF IMAGES FROM A CAMERA EMBEDDED OR ATTACHED TO A TEST AND MEASUREMENT TOOL," which is assigned to the assignee of the instant application, and which is hereby incorporated by reference in its entirety. In such embodiments, any or all of the analysis of the image data or the triggering of one or more measurements by the test and measurement tool 500 can be performed by the external device. In some examples, any of the devices can be in communication with a network for remote data communication or storage. For instance, image data or measurement data can be stored together in a memory in any of the imaging tool 502, the test and measurement tool 500, an external device, a remote location, or the cloud.

Figure 6:
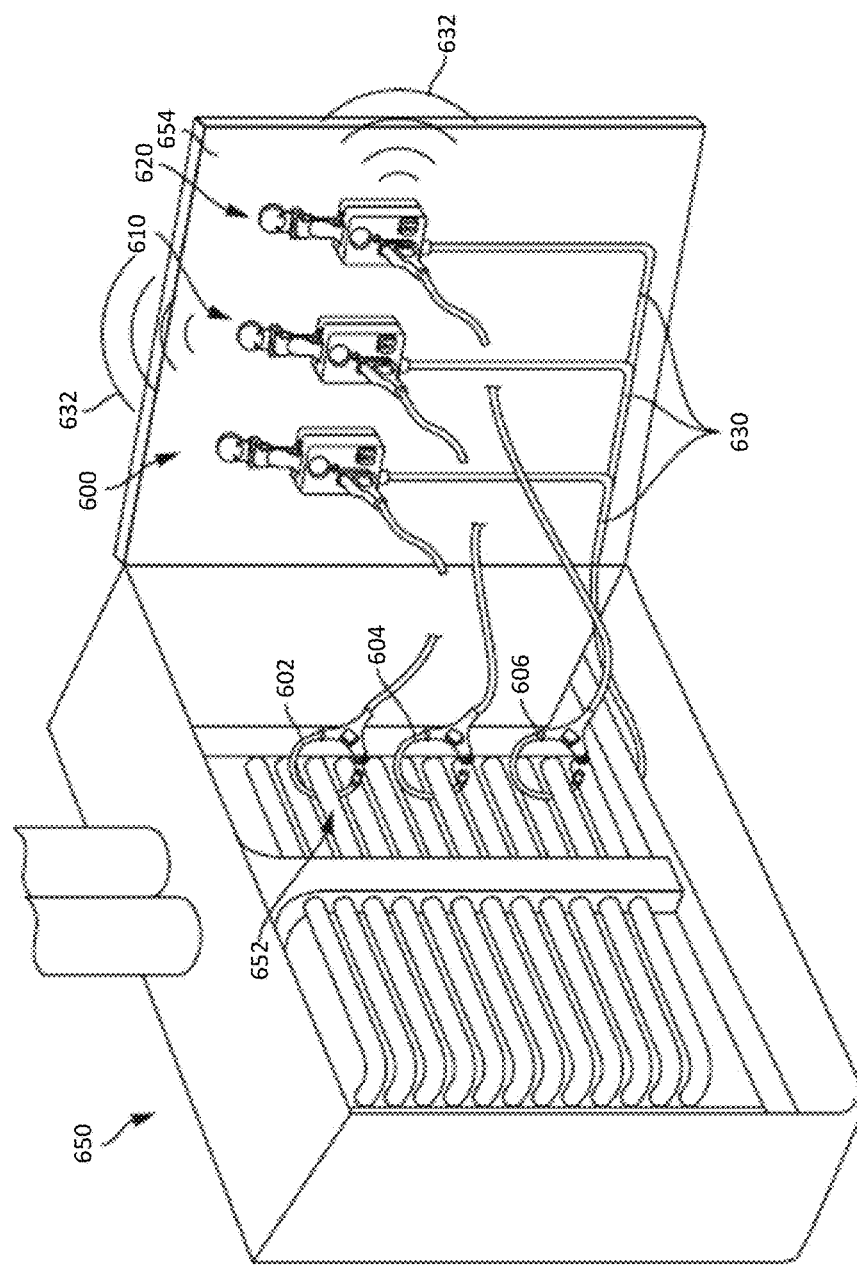
FIG. 6 shows an exemplary system including a plurality of tools for monitoring a system.

FIG. 6 shows an exemplary system including a plurality of tools for monitoring a system. In the illustrated example, tools 600, 610, and 620 are affixed to the door 654 of an electrical cabinet 650 housing electrical equipment 652. The tools can be affixed to the door 654 by a variety of methods, such as magnetically, via hook and loop fasteners, etc. (e.g., via attachment mechanism 314 of FIG. 3). Tools 600, 610, and 620 are in communication with test and measurement accessories 602, 604, and 604, respectively, which are configured to produce signals representative of currents flowing through various pieces of electrical equipment 652. Accordingly, each of tools 600, 610, and 620 are capable of generating measurement data representative of the current flowing through portions of the electrical equipment 652. Additionally, each of tools 600, 610, and 620 include imaging devices capable of generating image data representative of a target scene. When the door 654 of the cabinet 650 is closed, the tools 600, 610, and 620 can be arranged so that the target scene for each of the imaging devices includes electrical equipment 652.

During operation, each of tools 600, 610, and 620 can monitor electrical characteristics of (e.g., the current flowing through) various portions of the electrical equipment 652 and/or image data (e.g., infrared image data) of the electrical equipment 652. In some embodiments, when one or both of image data and measurement data meet one or more predetermined conditions, one or more of tools 600, 610, and 620 can perform one or more corresponding actions, for example, based on instructions stored in a memory accessible by a processor. Performing one or more actions in response to one or more predetermined conditions can be performed, for example, as described in U.S. patent application Ser. No. 14/856,046, filed Sep. 16, 2015, and entitled "INFRARED CAMERAS USED AS A METHOD TO TRIGGER OPERATION AND/OR RECORDING OF TEST AND MEASUREMENT DEVICES," which is assigned to the assignee of the instant application, and which is hereby incorporated by reference in its entirety.

In the illustrated embodiment, tools 600, 610, and 620 can be powered via power cables 630. In various examples, power cables 630 may be powered from a power source in or proximate the cabinet 650, such as an outlet or the like. In other examples, power cables 630 may parasitically draw power from electrical equipment 652 within the cabinet. Tools 600, 610, and 620 may be configured to communicate one or both of image data and measurement data to an external device such as a smartphone, tablet, computer, or other device via wireless communication 632. In some such embodiments, a user such as a system technician can receive image and or measurement data regarding electrical equipment 652 from the tools 600, 610, and 620 without opening the electrical cabinet 650. Additionally or alternatively, communication 632 can be configured to communicate data over a network (e.g., the internet), for example, to a remote facility.

In various examples, any one or more of a test and measurement tool, an imaging tool, an external device, or equipment at a remote facility can include a display for displaying any acquired data or other available parameters. One or both of the test and measurement tool and the imaging tool can be configured to transmit any combination of data to the other device, to a third device, or to a remote location (e.g., via a wired connection, wireless connection, or over a network) for viewing and analysis by a user and/or a processor. In some examples, the remote location can receive data from one or both of the imaging tool and the test and measurement tool and can communicate command data to one or both of the imaging tool and the test and measurement tool to initiate one or more operations to be performed. That is, any combination of image data and measurement data can be communicated to and analyzed at a remote location. Similarly, the remote location can command one or both of the imaging tool and the test and measurement tool to perform one or more operations based on the received data (e.g., in response to a met threshold). While FIG. 6 illustrates an exemplary system for monitoring components in an electrical cabinet, other systems may be used to monitor equipment in different environments, such as mechanical enclosures, intrinsically safe enclosures, hazardous areas, and the like.

In some examples, imaging tool and/or test and measurement tools can include a fastener as described elsewhere herein for temporary or permanent affixing to a location. Exemplary fasteners can include, for example, a magnet or a strap. Accordingly, the imaging tool can be affixed proximate a piece of equipment under test or to be tested in order to acquire data regarding the equipment via the imaging tool. The imaging tool can be affixed temporarily or permanently inside or onto structures or components such as an electrical cabinet, transformer, mechanical enclosure, or the like for the monitoring of associated or proximate equipment. In some examples, the imaging tool can be affixed to a test and measurement tool, which may be affixed proximate equipment under test. As described elsewhere herein, in some embodiments, the imaging tool can be powered by components, either directly or parasitically, within an enclosure or cabinet in which it is positioned. The imaging tool can be configured to function independently, or in conjunction with one or more test and measurement tools or another mobile/portable device. In general, imaging tools can be similar to those described in U.S. patent application Ser. No. 14/855,884, which is incorporated by reference.

In some examples, the imaging tool can be affixed to a location via a movable attachment mechanism, such as a gimbal, telescope, gooseneck, or other mechanism so that the imaging tool can be pivoted, rotated, translated, or moved in any other way. Similarly, in some embodiments, the imaging tool can be movably attached relative to a test and measurement tool. That is, in some embodiments, one or more imaging tools may be attached to another object (e.g., a test and measurement tool) such that the target scene of the imaging tool may be adjustable. Some such mounting techniques are described in U.S. patent application Ser. No. 14/855,844, filed Sep. 16, 2015, and entitled "METHOD OF ATTACHING CAMERA OR IMAGING SENSOR TO TEST AND MEASUREMENT TOOLS," which is assigned to the assignee of the instant application, and which is hereby incorporated by reference in its entirety.

In some examples, one or more imaging tools of a system can be in communication with a control center configured to monitor operation or other parameters of a proximate piece of equipment under test. Communication between the one or more imaging tools and the control center can be wired or wireless. In various examples, the one or more imaging tools can provide a live stream of data or images to the control center. Data can be any available data regarding the equipment under test. Images can include a live video stream, or a series of images captured with some fixed or variable time between them. In the event that an imaging tool can detect infrared (IR) image data, the imaging tool can provide thermal information to the control center.

Additionally or alternatively, one or more test and measurement tools can be in communication with the control center. The one or more test and measurement tools can be separate from the one or more imaging tools or combined with imaging tools to form one or more combination tools. The one or more test and measurement tools can be configured to communicate measurement data representative of one or more parameters of an object under test to the control center via wired or wireless communication. In some examples, image data from the one or more imaging tools and measurement data from the one or more test and measurement tools can be communicated to the control center via the same communication link.

In some embodiments, an imaging tool in communication with the control center can be configured to provide alarm or other notification data to the control center based on detected data. For example, in the event that the imaging tool is configured to detect infrared (IR) image data, the imaging tool can provide an alarm to the control center based on detected thermal data (e.g., a temperature threshold, temperature gradient threshold, or the like). In some embodiments, the imaging tool can further provide location information regarding the location of the imaging tool, the equipment under test that triggered the alarm, or both.

The control center can include a control station configured to receive image information from imaging tool. In some examples, the control station can analyze one or both of measurement data and image data (e.g., IR image data) and generate an alarm based on the analysis. In some examples, the control center can provide signals or commands to one or both of the test and measurement tool and the imaging tool. For example, the control station can prompt one or both of an imaging tool and a test and measurement tool to acquire image data or measurement data, respectively. In some embodiments, such prompting can be performed in response to one or more detected predetermined conditions from one or both of an imaging tool and a test and measurement tool, such as described in U.S. patent application Ser. No. 14/856,046, which is incorporated by reference. In some examples, the control center can be capable of adjusting the position of an imaging tool by actuating a movable attachment mechanism affixing the imaging tool to a location. Additionally or alternatively, an imaging tool can include movable optics such that repositioning the movable optics adjusts the target scene in the field of view of the imaging tool. For instance, in an exemplary operation, the control station can signal the imaging tool to move a certain number of degrees in a given direction (e.g., 10 degrees left) in order to adjust the field of view of the imaging tool.

The control center can communicate any or all of the information received from an imaging or test and measurement tool (e.g., image data, temperature data, measurement data, alarm condition, location information etc.) or additional data (e.g., alarm triggered at control center) over a network. In some examples, such data is communicated to a technician, such as to a mobile device of the technician. In addition to the test and measurement tools referenced above, Mobile devices can include smartphones, tablets, mini-tablets, smart watches, heads-up devices, or capable glasses or personal protective equipment such as face shields, helmets, or bump caps. Such devices can be capable of displaying information such as described in U.S. patent application Ser. No. 14/855,989, which is incorporated by reference. In some embodiments, the mobile device can itself be a test and measurement tool of the technician. Received data can include any combination of data from an imaging tool, data from a test and measurement tool, or additional data from the control center.

In some instances, data is automatically presented on a display of the mobile device to be observed by a user. In other embodiments, the user is notified of data that is available for viewing. The user can receive the data from the control center and take appropriate action based on the received data. For example, in the event of an alarm condition, the technician can travel to the site of the equipment under test and address the condition triggering the alarm and investigate and address the alarm condition. In some embodiments, the imaging tool and/or the test and measurement tool can be configured to communicate any or all available information directly to the mobile device or test and measurement tool of the technician without requiring the data to be first sent to the control center.

The technician can receive the alarm or other data from one or both of the imaging tool and the test and measurement tool (or a combination tool capable of generating both image data and measurement data), either via the control center or directly, and travel to the location of the equipment under test to perform service. In some examples, one or both of the imaging tool or the test and measurement tool monitoring the equipment under test and the technician's mobile device can include a proximity sensor. In some such embodiments, the proximity sensor can determine when the technician is within a predetermined proximity of the imaging or test and measurement tool.

In some examples, proximity sensor can use any number of technologies to determine the distance between the mobile device and the tool. For example, in some embodiments, equipment under test (e.g., the equipment monitored by imaging tool and/or test and measurement tool) includes associated position data. Known position data of the equipment can be combined with data regarding the current position of the mobile device to determine the relative proximity of the mobile device and the equipment. In various examples, the position of the mobile device can be determined using triangulation (e.g., using WiFi or radio signals), GPS positioning, manual location entry, and the like. In some examples, the position of the equipment can be determined using similar methods in the event that the location of the equipment is not known from predefined position data.

Communication between imaging tool or test and measurement tool monitoring the equipment under test and a technician's mobile device can be initiated based on the proximity of the mobile device to the equipment. For instance, in various embodiments, communication can be initiated by proximity switches, communication and reading of RFID tags, transmitters, and readers, or by manual means.

In some embodiments, the system can be configured such that, when the technician (e.g., the mobile device of the technician) is within the predetermined proximity of the imaging tool or the test and measurement tool, the mobile device can receive and display live or recorded data from the nearby imaging tool and/or test and measurement tool. Accordingly, the technician is able to view or analyze (e.g., thermal image analysis) the equipment under test or portions thereof without requiring a direct line of sight to the portion of the equipment being analyzed. For instance, a user may be able to view or analyze internal parts of a larger piece of equipment, or equipment within electrical or mechanical enclosures (e.g., electrical panel, mechanical gearbox) that may be difficult and/or unsafe to view directly.

Figure 7:
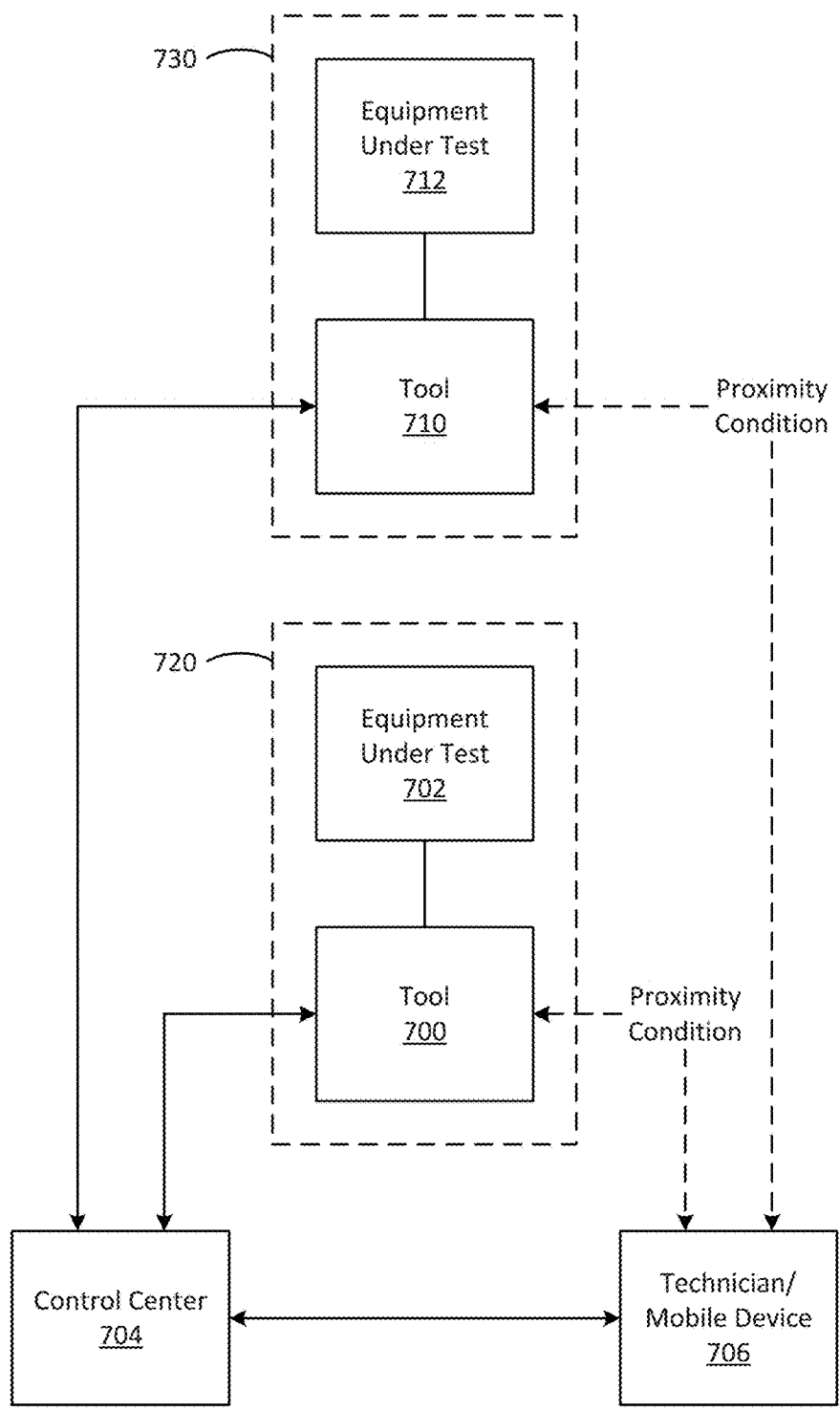
FIG. 7 is a diagram illustrating operation of an exemplary system.

FIG. 7 is a schematic diagram showing exemplary communication between a tool, a control center, and a technician device. In the illustrated embodiment, a tool 700 is configured to interface with equipment under test 702 in order to generate data associated with equipment under test 702. Tool 700 can include an imaging tool configured to generate image data representative of the equipment under test 712, a test and measurement tool configured to generate measurement data representative of at least one parameter of the equipment under test 702, or both.

The tool 700 is in communication with a control center 704 via wired and/or wireless communication. As described elsewhere herein, the tool 700 can communicate data (e.g., measurement data, image data, alarm data, etc.) to the control center 704. For example, in some embodiments, the tool 700 can stream live, real-time image and/or measurement data to the control center 704 for monitoring. In other embodiments, tool 700 can provide periodic data updates to the control center 704 based on a communication schedule. In still further embodiments, the tool 700 can communicate data to the control center 704 based on data generated by the tool 700 satisfying one or more predetermined conditions. For example, the tool 700 can be capable of comparing the data to a threshold or otherwise processing the data to determine whether or not the data satisfies one or more predetermined conditions. Based on the satisfied conditions, the tool 700 can communicate with the control center 704. As described elsewhere herein, the tool 700 can communicate the generated data (e.g., image data and/or measurement data), other information representative of the generated data or of the satisfied condition (e.g., text data), or a combination thereof.

As shown in the illustrated embodiment, communication between the tool 700 and the control center 740 can be two-way communication. In some such embodiments, the control center 704 can communicate with the tool 700. For example, the control center 704 can initiate data capture and/or transmission by the tool 700. Additionally or alternatively, the control center 704 can provide instructions to the tool 700 for when to capture data, when to communicate data, and what data to communicate. In some examples, control center 704 can be used to reposition the tool 700 (e.g., an imaging tool) in order to adjust the equipment under test 702 and/or the data generated by tool 700.

The control center 704 can be in communication with a mobile device 706 of a technician. As described elsewhere herein, the control center 704 can communicate information to the mobile device 706 based on data generated by tool 700. Information communicated to the mobile device 706 from the control center 704 can include image and/or measurement data generated by the tool 700 or alarm information generated by the tool 700 or by the control center 704 based on the image and/or measurement data satisfying at least one predetermined condition.

Upon receiving the information from the control center 704 via the mobile device 706, the technician can travel to the equipment under test 702 to perform further inspection or analysis. As described elsewhere herein, when the mobile device 706 satisfies a proximity condition relative to the tool 700, the mobile device 760 can communicate with the tool 700. When in communication with the mobile device 706, the tool 700 can transmit generated data (e.g., image data and/or measurement data) to the mobile device 706 for display and/or analysis. In some examples, the communication between the tool 700 and the mobile device is two-way communication in which the mobile device is capable of sending information and/or commands to the tool 700. For example, mobile device 706 can instruct tool 700 to capture data or, in the case of an imaging tool, adjust the field of view. Thus, once alerted by the control center 704 via mobile device 706, a technician can travel to the equipment under test 702 and communicate with tool 700 in order to perform additional analysis or service.

In some embodiments, the tool is configured to communicate location or other identification data to the control center 704 indicative of the tool and/or the equipment under test communicating with the control center 704. The control center 704 can identify which tool is communicating data thereto, and relay the identification information to the mobile device 706 so that the technician knows which tool and/or equipment under test to travel to for further analysis. For example, in the illustrated embodiment, tool 700 and equipment under test 702 are located at a first location 720. Data communicated from tool 700 to control center 704 can include identification information alerting the control center 704 that received data pertains to one or both of tool 700 and equipment under test 702 at the first location 720.

The control center 704 can further be in communication with tool 710 located at a second location 730 and configured to generate data associated with equipment under test 712. Communication can be similar to that described above regarding tool 700 and equipment under test 702. Data communicated from tool 710 to control center 704 can include identification information alerting the control center 704 that received data pertains to one or both of tool 710 and equipment under test 712 at the first location 720.

The data received by the technician via the mobile device 706 can include identification information regarding which tool (e.g., of 700 or 710) and/or equipment under test (e.g., of 702 or 712) is associated with received data. Accordingly, the technician knows which of the first 720 and second 730 location to travel to in order to provide additional analysis or service. In general, a single control center 704 can be in communication with any number of tools interfacing with any number of pieces of equipment under test at any number of locations. Technicians may be responsible for serving a subset of locations having such tools, and accordingly, data may be communicated from the control center 704 to the mobile device 706 of the technician responsible for the equipment and/or location requiring additional analysis or service.

Figure 8:
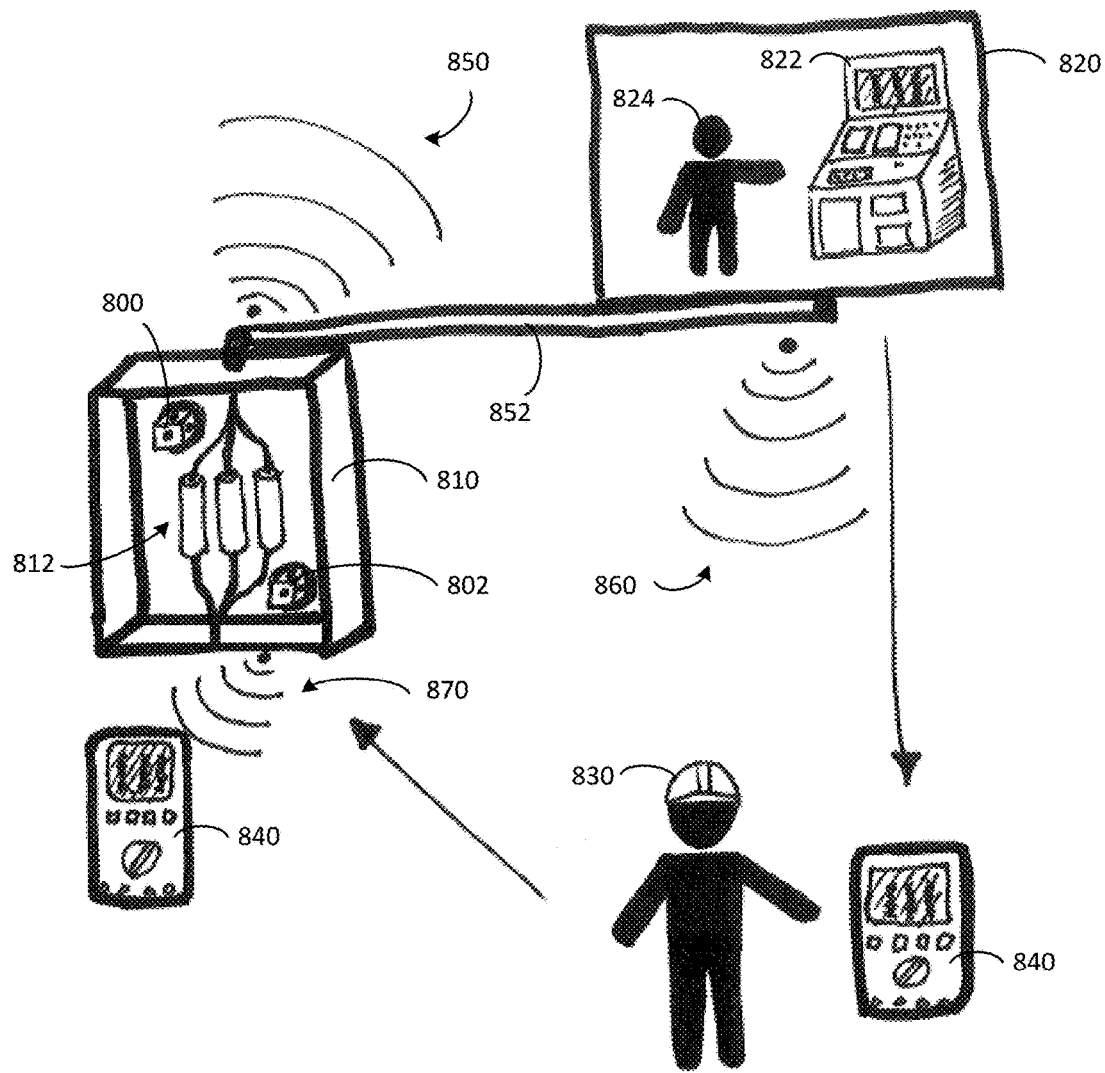
FIG. 8 is a schematic representation illustrating the use of an exemplary system according to some embodiments.

FIG. 8 illustrates the use of an exemplary system according to some embodiments of the invention. In the system of FIG. 8, a tool 800 is fixed within an electrical cabinet 810 configured to generate data representative of electrical components 812 within the electrical cabinet 810. In some examples, tool 800 can include a test and measurement tool configured to generate measurement data representative of at least one parameter of the electrical components 812. Additionally or alternatively, tool 800 can include an imaging tool configured to generate image data representative of a target scene, for example, including the electrical components 812. That is, in some embodiments, tool 800 can be similar to tool 300 of FIG. 3 or tools 600, 610, and 620 of FIG. 6, including test and measurement and imaging capabilities. Alternatively, tool 800 can include both an imaging tool and a test and measurement tool that are not integrated into a single tool. The tool 800 can be battery powered, powered by wired power within the electrical cabinet 810, powered by a parasitic power relationship with electrical components 812, or by any other appropriate methods. In some examples, tool 800 can include or otherwise be in communication with memory for storing acquired data.

In the illustrated embodiment, tool 800 is in communication with a control center 820 via one or both of wireless communication 850 or wired communication 852. The control center can include a control station 822, which can be controlled by a control center technician 824, operate autonomously, or both. In some instances, the control station 822 can be used to receive data (e.g., image data, measurement data, or both) from tool 800. The control station 822 can perform any one or more of combining, displaying, and processing data received from the tool 800. As shown, the control station 822 can include a display for displaying data from tool 800. In some examples, the control station 822 can stream live or prerecorded data from tool 800. The control station 822 can receive or generate an alarm condition based on the data generated from tool 800. In various examples, an alarm condition can correspond to data generated by tool 800 (e.g., image data, measurement data, or both) meeting a predetermined requirement. In some examples, in which the tool 800 can determine temperature information (e.g., an infrared imaging tool or a contact temperature measurement tool), an alarm condition may include the temperature of an object under test exceeding a predetermined threshold. Additionally or alternatively, in some examples, an alarm condition can include electrical characteristics of equipment under test (e.g., electrical components 812) meet a predetermined condition.

In some examples, tool 800 is programmed with alarm conditions based on data generated by the tool. That is, an imaging tool configured to generate image data and/or a test and measurement tool configured to generate measurement data can be programmed with image and/or measurement alarm conditions, respectively. Accordingly, tool 800 may detect an alarm condition without requiring data to be sent to the control center 820 for analysis. In some such embodiments, tool 800 only communicates information to the control center 820 in the event of an alarm condition.

For example, a tool including an infrared imaging tool may process infrared data and, in the event that the infrared data satisfies predetermined condition (e.g., a temperature alarm), the tool can communicate image data (e.g., a single image, an image stream, etc.) indicating the condition to the control center 820. Similarly, a test and measurement tool may detect measurement data indicative of at least one parameter of a device under test. In the event the measurement data satisfies a predetermined condition, the test and measurement tool can communicate measurement data to the control center (e.g., 820) indicative of the predetermined condition. In such embodiments, the tool (e.g., 800) can communicate image and/or measurement data as a one-time snapshot and need not continually transmit unnecessary data to the control center 820.

In other examples, a tool detecting that data (e.g., measurement data and/or image data) satisfies a predetermined condition signal the condition to the control center without expressly communicating the data that satisfies the condition (e.g., the measurement and/or image data). For instance, in some embodiments, the tool may communicate a text-based message to the control center indicative of the predetermined condition. The text may describe the satisfied condition and/or may include a code that corresponds to the satisfied condition. In such embodiments, the tool can alert the control center of a satisfied predetermined condition while reducing the amount of data used to send the alert. For example, in some cases, a text-based alert that indicates overheating in an electrical cabinet based on IR image data requires transmitting much less data the transmitting the image data itself.

In some embodiments, the control station 822 can communicate control or command data to the tool 800. For instance, in various examples, the control station 822 can be used to control the field of view of an imaging tool, such as via a zoom or repositioning function. For instance, in some examples, an imaging tool may be attached to a test and measurement tool or other portion of electrical cabinet 810 by a mechanism to facilitate the repositioning of an imaging element of the imaging tool. Exemplary mechanisms are described in U.S. patent application Ser. No. 14/855,844, which is incorporated by reference, and can include, for example, a gimbal or other rotatable mount, a flexible gooseneck, a telescoping portion, and the like. In some embodiments, such mechanisms can be controlled mechanically, e.g., via servomotors or the like. Control station may communicate signals to cause such a mechanism to reposition an imaging tool so as to adjust the field of view of the imaging tool. Additionally or alternatively, the control station 822 may be used to acquire image data using an imaging tool and/or acquire measurement data from a test and measurement tool.

The control station 822 can be configured to send data to an external device such as a mobile device 840 of a technician 830, for example, via communication link 860. Mobile devices can include any device suitable for receiving and displaying information. In some examples, mobile device can include a test and measurement tool, a smartphone, a tablet, a wearable smart device, a computer, or the like. In some embodiments, mobile devices may function similar to the external devices described in U.S. patent application Ser. No. 14/855,989, which is incorporated by reference. Communication link 860 can include wired or wireless communication. In some examples, control station 822 communicates with mobile device 840 via a network such as the internet.

The technician 830 can receive data via the mobile device representative of data generated by tool 800. For example, in some embodiments, tool 800 includes an imaging tool, and the technician 830 receives image data via the mobile device 840. Additionally or alternatively, the tool 800 can include a test and measurement tool, and the technician receives measurement data via mobile device 840. In some embodiments, received data can include location information indicative of the location of one or both of the tool 800 and the equipment under test (e.g., electrical components 812). Thus, the technician 830 receiving the location information can travel to the location of the equipment under test to perform service or further analysis.

In some embodiments, one or both of the mobile device 840 and tool 800 can include a proximity device such that, when the mobile device 840 (and therefore, the technician 830) is within a predetermined proximity of the tool 800, the tool 800 can transmit data to the technician's mobile device 840. For instance, in some embodiments, tool 800 includes an imaging tool which can transmit image data of the electrical components 812 to the mobile device 840 via wireless communication 870. Transmitted data can include live or previously captured image data representative of the equipment under test. In various examples, the tool includes an infrared imaging tool and the transmitted data can include thermal image data representative of the heat pattern of the electrical components 812.

As discussed elsewhere herein, additionally or alternatively, the tool 800 can include a test and measurement tool. In some such embodiments, transmitted data can include measurement data representative of at least one parameter (e.g., an electrical parameter) of the electrical components 812. In some embodiments, tool 800 includes both an imaging tool and a test and measurement tool, and is capable of transmitting one or both of image data and measurement data to mobile device 840.

The mobile device 840 can be configured to display the data received from the tool 800. For instance, in various embodiments, the mobile device can receive one or both of image data and measurement data from tool 800. Accordingly, in some such embodiments, the technician 830 can observe and analyze properties of the electrical components 812 without opening the electrical cabinet 810, allowing for safe analysis without requiring a shutdown of the electrical system. In some examples, the mobile device 840 can receive a notification that data from the tool 800 is available for live or recorded viewing. In such an embodiment, the technician 830 can enable the live or recorded viewing of data via the mobile device 840.

Additionally or alternatively, the data communicated to the technician 830 provides details useful in performing additional measurements. For example, the received data may prompt the user to perform one or more tasks, such as measuring one or more electrical properties of the electrical components 812 or performing an imaging task. In some examples, the user may perform such a task via mobile device 840. That is, mobile device may include a test and measurement tool capable of measuring at least one parameter of the electrical components 812 and/or an imaging tool capable of generating image data representative of the electrical components. In some embodiments, mobile device 840 can include an imaging tool such as described in U.S. Patent Publication No. US20100163730, corresponding to U.S. patent application Ser. No. 12/647,175, filed March Dec. 24, 2009, and entitled "INFRARED IMAGING PROBE," which is assigned to the assignee of the instant application, and which is hereby incorporated by reference in its entirety, for imaging potentially dangerous electrical components 812. Additionally or alternatively, the mobile device 840 can include a combination imaging tool and test and measurement tool, such as described in U.S. patent application Ser. No. 14/855,844, which is incorporated by reference. In some embodiments, the combination tool can include electrical isolation such as described in U.S. Provisional Patent Application No. 62/219,415, filed Sep. 16, 2015, and entitled "SYSTEMS AND METHODS FOR PLACING AN IMAGING TOOL IN A TEST AND MEASUREMENT TOOL," which is assigned to the assignee of the instant application, and which is hereby incorporated by reference in its entirety. In some embodiments, the mobile device can include a smartphone or tablet capable of performing one or both of a measurement function and an imaging function, for example, via an isolated input block such as those described in U.S. patent application Ser. No. 14/855,864, which is incorporated by reference.

In some embodiments, communication 870 can be two-way communication. In some such embodiments, the mobile device 840 can be used by the technician 830 to control aspects of the tool 800. For example, in the event that tool 800 includes an imaging tool, the technician 830 can use the mobile device 840 to adjust the position of the imaging tool in order to change the field of view or to acquire image data. Additionally or alternatively, in the event that tool 800 includes a test and measurement tool, the technician 830 can use the mobile device 840 to view or acquire measurement data from the test and measurement tool. The mobile device 840 can be used to adjust or control other aspects of the tool 800 or the data received therefrom, such controlling the capture of data or the way in which the received data is displayed.

Some systems can include a second tool 802 configured to operate in a way that is the same as or similar to operation of the tool 800 described above. Similar to tool 800, the second tool 802 can include an imaging tool, a test and measurement tool, or both. The second tool 802 can be positioned to as to generate similar or different data as tool 800. For example, if tools 800 and 802 each include imaging tools, imaging tool 802 may image data representative of a different field of view than imaging tool 800. For example, imaging tool 802 can provide image data representative of parts of the equipment under test not visible to imaging tool 800. If tools 800 and 802 each include a test and measurement tool, in various examples, test and measurement tool 800 and test and measurement tool 802 may measure substantially the same parameter or may measure different parameters.

As with tool 800, the second tool 802 can communicate data to one or both of the control station 822 and the mobile device 840. In some embodiments, control station 822 and mobile device 840 can provide a user interface by which a user, such as technicians 824, 830, can select to view image data from either of tools 800, 802. In some examples, either one or both of the control station 822 and the mobile device 840 can be configured to display data from both tools 800, 802 simultaneously. In some examples, tools (e.g., 800 and 802) have different communication properties. For instance, in some embodiments, tool 800 is configured to communicate data to the control center 820 while tool 802 is configured to communicate data to a technician's mobile device 840. In general, such systems can include any number of tools such as 800, 802 in communication with or able to communicate with one or both of the control station 822 and a mobile device 840. In some examples, mobile device 840 can communicate with any number of such tools when within a predetermined proximity of any such tools. In some embodiments, a user (e.g., technician 830) selects which tool or tools from which to view data. The user may select the appropriate tool based on identification or other information communicated from a tool to the control center 820.

Descriptions of the mobile device 840 of FIG. 8 can apply similarly to any appropriate portable device, such as test and measurement tools, smartphones, tablets, computers, and the like. Systems such as that illustrated in FIG. 8 allow for improvements in the process of receiving notification of and addressing issues of equipment under test. For instance, the communication of data from the tool to the mobile device of the technician allows for simplified human resources management related to maintenance and inspection. The wireless communication between the tool and the mobile device when the technician is within a predetermined proximity of the imaging tool can provide for improved safety and reliability of performed maintenance and inspection.

Figure 9:
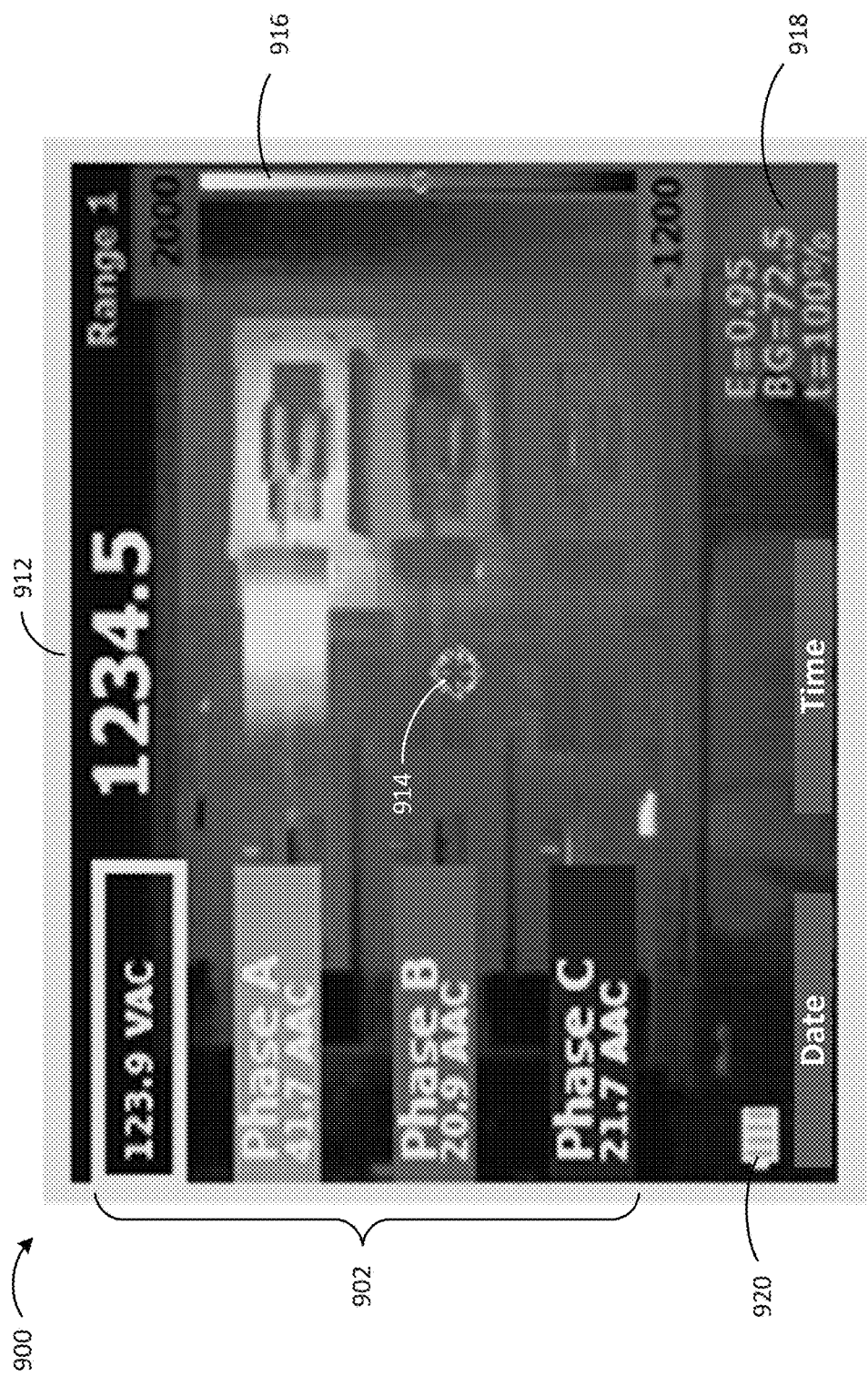
FIG. 9 is an exemplary display showing combined image and measurement data.

As described, in some examples, a tool (e.g., tool 800 in FIG. 8) or combination of tools can communicate measurement data and/or image data to a display (e.g., in one or both of a control station and a mobile device). In some examples, both image data and measurement data can be processed to generate a display comprising both the image data and the measurement data for presentation to a user such as is shown in FIG. 9. FIG. 9 is an exemplary display showing combined image and measurement data. In the illustrated example, the display 900 includes measurement data 902 comprising a measurement of current flowing through three conductors and a measured voltage. In some examples, measurement data 902 may be acquired from a single test and measurement tool capable of measuring both current and voltage. In other examples, measurement data 902 comprising both voltage and current data may be acquired from a plurality of test and measurement tools, such as a volt meter and an ammeter or other current measuring device.

In still further embodiments, known information regarding the object under test may be used to supplement measurement data. For instance, if the resistance values of the conductors of FIG. 9 are known, voltage or current measurements may be used to calculate the other. In some such examples, supplementary information such as resistance values may be stored in memory or input by a user via a user interface, for example in response to a prompt.

In the illustrated embodiment, image data presented on the display includes infrared image data representative of the thermal pattern across the scene. In the illustrated example, the display 900 includes temperature information 912 representative of the temperature of a selected spot 914 on the display. In some examples, a user may adjust the location of spot 914 for displaying a temperature of an area of interest. The display 900 includes a temperature scale 916 that associates colors within a palettized IR image to corresponding temperature values. Any appropriate palettization scheme may be used, such as grayscale, red-blue, ironbow, amber, and others. The temperature scale 916 may be used to provide an indication to a viewer of the temperature of various points in the scene without requiring the placing of spot 914 over each point.

In some embodiments, other data 918 can be included in the display. Such data can include supplementary information for the image data (e.g., an emissivity value) or the measurement data. Other information that can be displayed include battery life information 920 or information data received from one or more other devices (e.g., test and measurement tools, imaging tools, etc.) or a network such as the internet. In various examples, such data can include information from specifications, FAQs, operating instructions, and the like.

In various embodiments, at least one of the location and content of displayed data is predetermined based on which devices are in communication. For instance, in one example, any acquired data (e.g., at least one parameter from the test and measurement tool, image data from the imaging tool, etc.) can be displayed on the test and measurement tool by default. In another example, any acquired data is automatically displayed on an external device such as the mobile device of a technician if one is in communication with at least one of the test and measurement tool or the imaging tool. In some embodiments, a user can define what information is displayed on which devices. In some such embodiments, the user can make a selection via a user interface on any of the test and measurement tool, the imaging tool, or an external device regarding the type and location of displayed data using any of the available devices in communication with the system (e.g., test and measurement tool, imaging tool, external device, etc.).

Figure 10:
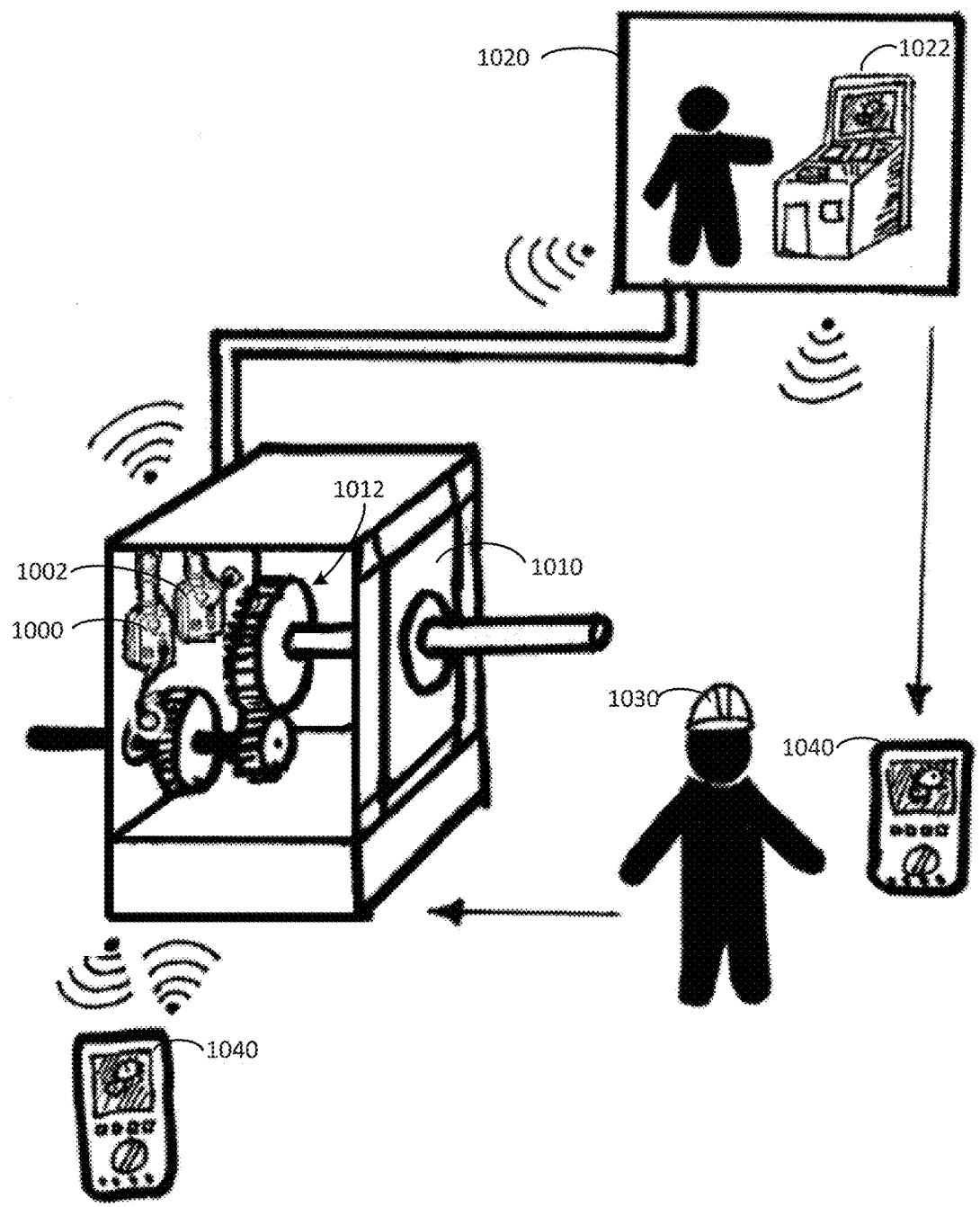
FIGS. 10-12 illustrate exemplary systems used in different environments according to some embodiments.
Figure 11:
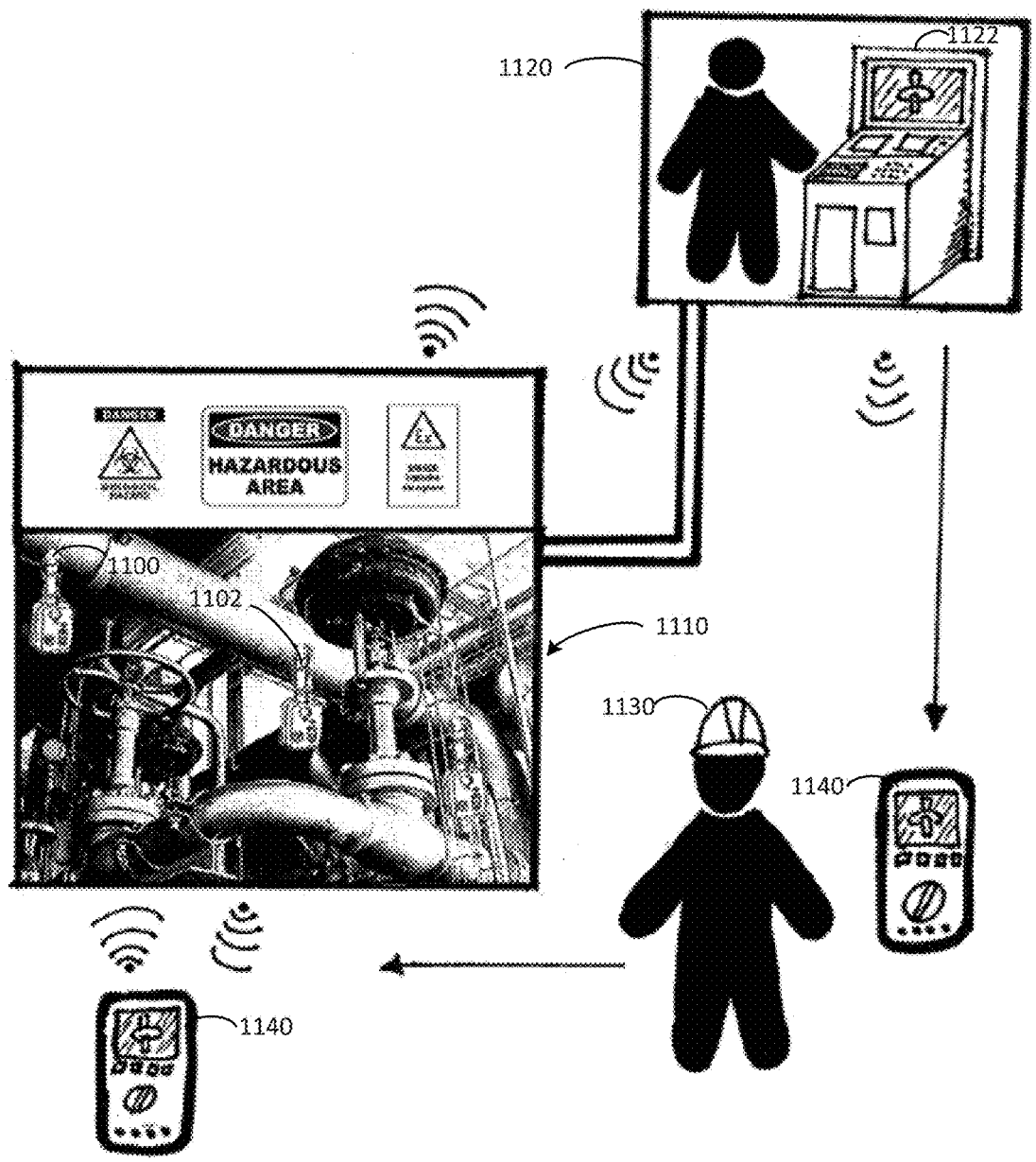
Figure 12:
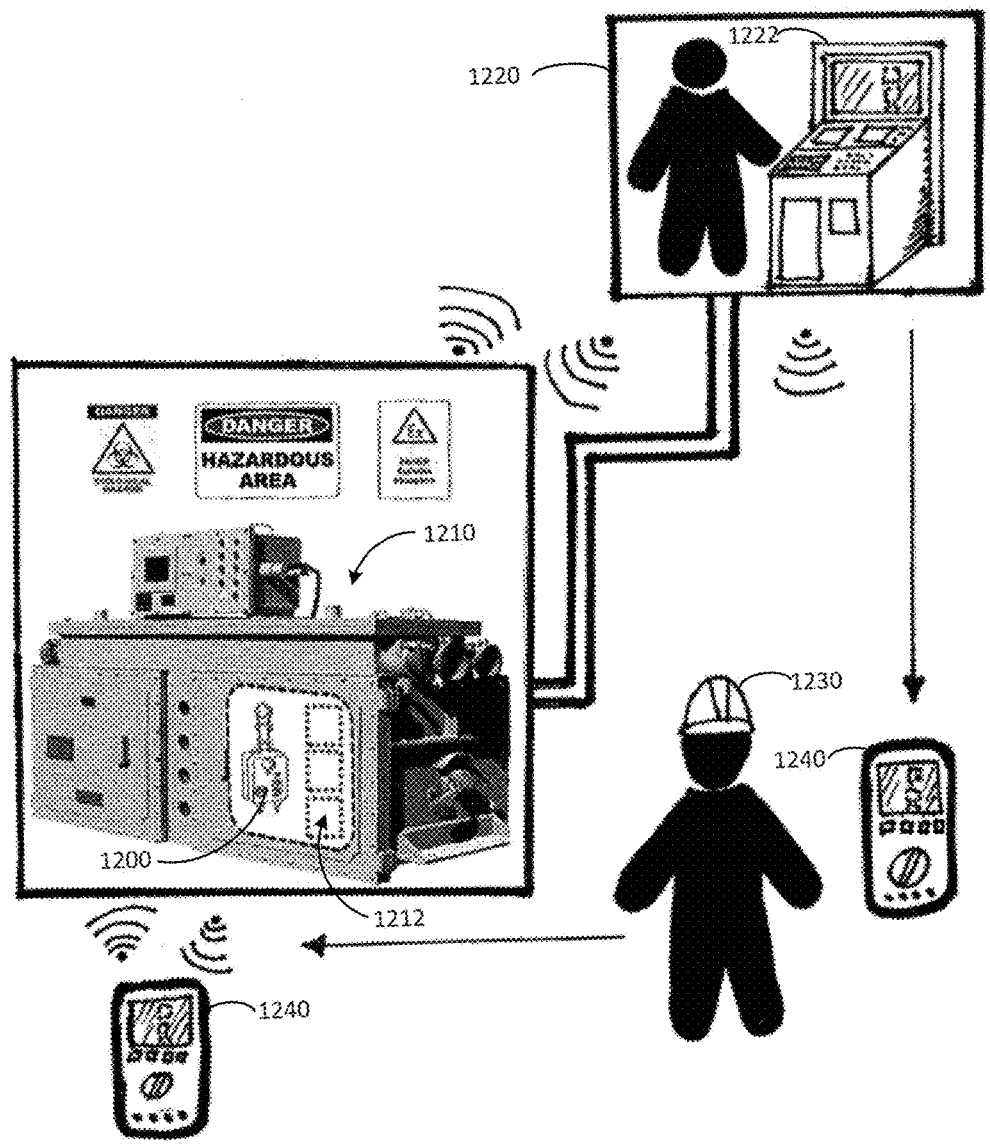

While the illustrated examples of FIGS. 8 and 9 illustrate systems generally comprising electrical equipment under test, it will be appreciated that systems described in the disclosure can be applied to a variety of environments. FIGS. 10-12 illustrate exemplary systems used in different environments according to some embodiments.

The environment of FIG. 10 includes a mechanical enclosure 1010 (e.g., a gearbox) enclosing mechanical components 1012 (e.g., gears). Tools 1000 and 1002 are disposed within the mechanical enclosure 1010 and are configured to generate data associated with mechanical components 1012. In some examples, the one or more tools comprise an imaging tool configured to generate image data (e.g., IR image data) representative of the mechanical components 1012. Additionally or alternatively, one or more tools can comprise a test and measurement tool configured to generate measurement data. In some embodiments, a test and measurement tool is capable of generating mechanical measurement data, such as vibration data, alignment data, torque data, rotational velocity data, and the like. For instance, in some examples, tool(s) 1000, 1002 can include tools such as described in U.S. Patent Application No. 62/245,351, filed Oct. 23, 2015, and entitled "USE OF INFRARED CAMREA AND VIBRATION ANALYSIS," which is assigned to the assignee of the instant application and is hereby incorporated by references in its entirety.

In some embodiments, multiple tools (e.g., 1000, 1002) are configured to perform different measurements. For example, in some embodiments, a system can include a first tool 1000 configured to generate measurement data representative of a first parameter of mechanical components 1012 within the mechanical enclosure 1010. A second tool 1002 can be configured to generate measurement data representative of a second parameter of mechanical components 1012 within the enclosure 1010. The first and second parameters can include different parameters (e.g., velocity and vibration), or the same parameter for multiple components (e.g., vibration of a first component and a second component). Additionally or alternatively, one or both of tools 1000 and 1002 can be configured to generate image data representative of one or more components 1012. For example, in some embodiments, the first tool 1000 can generate measurement data representative of a component while the second tool 1002 can generate image data representative of the same component. In another example, each tool (1000, 1002) can be configured to perform different measurements (e.g., a vibration measurement and a velocity measurement) of the same or different components 1012. Tools 1000, 1002 can be configured to acquire image data representative of the component or part of the component associated with the measurement data.

Tools 1000, 1002 can be in wired or wireless communication with a control station 1022 at a control center 1020. Data communicated from tools 1000, 1002 to the control station 1022 can be similar to that described elsewhere here. For example, data can include image data, measurement (e.g., mechanical) data, alarm data, location information, and the like. Also as described elsewhere herein, the control station 1022 can communicate data to the mobile device 1040 of a technician 1030 (e.g., alarm data, image data, measurement data, location information or combinations thereof). The technician 1030 can travel to the location of the mechanical enclosure 1010. When the mobile device 1040 is within a certain distance of one or both of tools 1000, 1002, tools can communicate data to the mobile device 1040. The technician 1030 can utilize the data communicated from the tool(s) 1000, 10002 to the mobile device in order to analyze the mechanical components 1012 or the operation thereof. In some examples, communication between the mobile device 1040 and tool(s) 1000, 1002 is bidirectional so that the technician 1030 can control operation of the tool(s) 1000, 1002 via the mobile device 1040 to assist in analysis.

The environment of FIG. 11 includes an open environment comprising potentially unsafe conditions. The exemplary environment includes a network 1110 of coupled pipes and valves, possibly carrying a hazardous substance or otherwise located in a potentially hazardous environment. Tools 1100, 1102 are configured to monitor one or more parameters associated with the network 1110. For example, test tools can include imaging tools (e.g., IR imaging tools), test and measurement tools capable of detecting properties of the network 1110 (e.g., alignment tools, gas or particulate detection tools, vibration detection tools, etc.). In some embodiments, one or both of tools 1100, 1102 can include accessories for determining various parameters of the network 1110. For example, in some embodiments, a tool (e.g., 1100, 1102) can include a light source for emitting light toward network 1110. In some such embodiments, a tool can perform a gas detection analysis such as described in U.S. patent application Ser. No. 14/310,914, filed Jun. 20, 2014, and entitled "LASER ILLUMINATED GAS IMAGING," which is assigned to the assignee of the instant application, and which is hereby incorporated by reference in its entirety.

In various configurations, tools can acquire and/or analyze data in order to detect various properties of the network 1110, such as a misaligned connection or a leak of the substance flowing through the network. As described elsewhere herein, tool(s) 1100, 1102 can communicate data (e.g., measurement data, image data, alarm data, position information, etc.) to a control station 1122 at a control center 1120. For example, a tool (e.g., 1100) can be configured to detect a gas leak from network 1110 and alert the control station of a potential leak. The control station 1122 can communicate corresponding information to the mobile device 1140 of a technician 1130, who can travel to the site to perform further inspection or analysis or provide service to address any detected problems.

In some examples, when the mobile device 1140 is within a predetermined proximity of the tool (e.g., 1100, 1102), communication between the tool and the mobile device can be initiated. Communication can include one or more of the tool communicating generated data to the mobile device and the mobile device being capable of controlling operation of the tool. Thus, in some examples, the technician 1130 can perform analysis of the network 1110 a safe distance from any potentially hazardous substance leaks. The technician 1130 can perform necessary repairs or other service with the assistance of data communicated to the mobile device 1140 from the tool(s) 1100, 1102.

In some examples, network 1110 can be within a bounded hazardous volume, such as a volume determined to be hazardous due to the presence of harmful substances. In some such examples, the bounded volume does not necessarily include a physical boundary, such as an enclosure. The volume may be hazardous from a human health perspective (e.g., potentially toxic substances, lack of breathable air, etc.) and/or may be hazardous for operating electronic devices lacking proper safety precautions. For example, in some embodiments, the bounded hazardous volume may include or potentially include (e.g., in the instance of a failure or other abnormal condition) an explosive atmosphere in which electrical equipment lacking in the proper safety protocols could trigger an explosion. The volume may be considered an intrinsically safe environment, in which case electronic equipment within the volume meets required safety standards. In some such embodiments, tools 1100, 1102 can comprise intrinsically safe tools configured to operate safely within the environment. For example, tools 1100, 1102 can be configured to operate without exceeding certain temperatures or emitting electrical arcs that could trigger ignition in an explosive atmosphere. Additional or alternative measures may be taken to ensure that tools 1100, 1102 are intrinsically safe within the environment of the hazardous volume.

The technician 1130 and mobile device 1140 may communicate with and/or operate tools 1100, 1102 safely from outside the hazardous volume. Thus, the mobile device 1140 can provide an interface for the technician 1130 to interact with tools 1100, 1102 without requiring the mobile device 1140 to necessarily meet intrinsic safety requirements for the hazardous volume. In some such embodiments, the predetermined proximity within which the mobile device can communicate with tools 1100, 1102 is based on the size of the hazardous volume and/or is at such that the mobile device 1140 can communicate with tools 1100, 1102 without entering the hazardous volume.

The environment of FIG. 12 includes an enclosure 1210 (e.g., an intrinsically safe enclosure) including internal components 1212. A tool 1200 (e.g., an imaging tool, a test and measurement tool, or a combination thereof) can be affixed permanently or temporarily to the interior of the enclosure 1210 for generating data associated with components 1212. As described elsewhere herein, tool 1200 can generate data (e.g., measurement data, image data, alarm data, position information, etc.) associated with the components 1212 in the enclosure 1210. The tool 1200 can communicate information to a control station 1222 at a control center 1220 based on the generated data, including a live stream of the data itself, a snapshot of the data, or other information indicative of the data (e.g., text-based information or alerts).

The control station can communicate such information to a technician 1230 via the technician's mobile device 1240. The technician 1230 can travel to the location of the enclosure 1210 to perform further analysis on the components 1212. In some examples, the mobile device 1240 communicates with the tool 1200 once the mobile device 1240 is within a certain proximity of the tool 1200. Thus, the technician 1230 can safely perform analysis of the components 1212 without requiring the opening of enclosure 1210, which may be providing a safety measure between the interior and exterior of the enclosure 1210.

As described with respect to FIG. 11, in some examples, tool 1200 can be an intrinsically safe tool capable of safely operating within a hazardous environment. For example, tool 1200 can be configured to not exceed a certain temperature and/or to not emit electrical arcs that could interact with the environment of the enclosure 1210. Thus, even if the interior of enclosure 1210 comprises a dangerous (e.g., explosive) atmosphere or environment, a technician 1230 can interface with intrinsically safe tool 1200 via mobile device 1240 without necessarily requiring the mobile device 1240 meet intrinsic safety requirements.

During operation of an exemplary system, an imaging tool fixed permanently or temporarily proximate a piece of equipment under test such that the equipment under test is in the field of view of the imaging tool. The imaging tool is configured to output data including at least one of image data, alarm notification data, and temperature data. Image data can include a live stream of images, a series of images taken at predetermined intervals, of image data captured in response to a request for image data. In some examples, imaging tool comprises an infrared imaging tool. In some such embodiments, the imaging tool is configured to compare detected infrared radiation patterns to predetermined alarm conditions and, in the event the detected infrared radiation meets one or more predetermined alarm conditions, outputting alarm data. The infrared imaging tool may additionally or alternatively determine and output temperature data.

The data from the imaging tool can be communicated to a control center, for example, via a wired or wireless communication link. The control center can analyze the received data from the imaging tool. In some examples, the control center can analyze the received data to detect alarm conditions in the received image data. In the event of an alarm condition (detected and communicated by the imaging tool or detected by the control center), the control center can alert a technician of the alarm condition. For example, the control center may communicate alarm information and/or image data to a mobile device of the technician, such as a smartphone, tablet, computer, test and measurement tool, or the like. Additionally or alternatively, the imaging tool may transmit data directly to the mobile device of the technician.

The information received by the technician can further include location data indicative of the location of the equipment under test. Such location data can include an address, GPS coordinates, a location name, a facility name or number from a list of facilities, or any other identifying information. In some examples, location information additionally or alternatively identifies the equipment by name, number, location, and the like. Thus, a technician receiving image data and location data is able to identify and travel to the equipment under test to perform further analysis.

Once the mobile device of the technician comes within a certain distance of the imaging tool, the imaging tool can transmit data directly to the mobile device for observation by the user. The data transmitted to the proximate user may be the same or different than the data transmitted to the control center. For example, in some embodiments, a user may receive an alarm signal from one or both of the imaging tool and the control center, and travel to the location of the equipment under test for inspection. The imaging tool could subsequently transmit image data to the technician's mobile device once it is within a predetermined proximity of the imaging tool. In another example, the technician can receive image data from the imaging tool or control center and, once within a predetermined proximity of the imaging tool, receive additional information, such as measurement data from a test and measurement tool.

While the exemplary embodiment used an imaging tool to initially monitor equipment under test and transmit data to one or both of a control center and a mobile device based on received image data, it will be appreciated that similar system operation can be based on other data. For example, a test and measurement tool may transmit measurement data and/or alarm conditions based on measurement data to the mobile device of a technician, either directly or via a control center. In some embodiments, both measurement data and image data may be transmitted, or may be used to generate an alarm signal. Once within a predetermined range of one or more tools monitoring the equipment under test, the user may receive any data (e.g., measurement data, image data, etc.) from the one or more tools. In some examples, the user may request or select which data is received by the mobile device. Additionally or alternatively, the technician may perform one or more additional tasks, such as a measurement task using a test and measurement tool or an imaging task using an imaging tool. In some examples, the technician can perform such tasks using the mobile device or a separate device.

Various embodiments have been described. Such examples are non-limiting, and do not define or limit the scope of the invention in any way. Rather, these and other examples are within the scope of the following claims.

The invention claimed is:

1. A system including:
   a first imaging tool having a first field of view such that the first imaging tool generates image data representative of one or more characteristics of a first object under test located at a first location;
a second imaging tool having a second field of view such that the second imaging tool generates image data representative of one or more characteristics of a second object under test located at a second location; and
a mobile device configured to:
receive a first set of data associated with data generated by the first imaging tool, the first set of data including at least location data representative of the location of the first imaging tool and/or the first object under test and one other signal representative of one or more characteristics of the first object under test and wherein when the mobile device is brought to within a first predetermined proximity of the first imaging tool, the mobile device receives a second set of data from the first imaging tool, the second set of data comprising at least one of a live or previously captured image data representative of the first object under test; and
receive a third set of data associated with data generated by the second imaging tool, the third set of data including at least location data representative of the second location and one other signal representative of one or more characteristics of the second object under test, and wherein when the mobile device is brought to within a second predetermined proximity of the second imaging tool, the mobile device receives a fourth set of data from the second imaging tool, the fourth set of data including at least one of live or previously captured image data representative of the second object under test.

2. The system of claim 1, wherein the first imaging tool is positioned within one of: an electrical cabinet, a mechanical cabinet, or an intrinsically safe environment.

3. The system of claim 1, wherein the mobile device comprises at least one of a smartphone, tablet, mini-tablet, PC, or wearable smart device.

4. The system of claim 1, wherein the mobile device includes a test and measurement tool.

5. The system of claim 1, further comprising a control station in communication with the first imaging tool and the mobile device, and wherein the control station is configured to receive alert data from the first imaging tool and to communicate the first set of data to the mobile device based on the alert data received from the first imaging tool.

6. The system of claim 5, wherein the alert data received by the control station is the same data as the first set of data communicated to the mobile device.

7. The system of claim 5, wherein the first imaging tool is configured to communicate alert data to the control station in the event that the image data satisfies a predetermined condition.

8. The system of claim 7, wherein the first imaging tool includes an infrared (IR) camera, the alert data comprises at least one of a temperature reading or a temperature alarm, and the predetermined condition comprises a temperature meeting a threshold.

9. The system of claim 1, wherein when the mobile device is brought to within a predetermined proximity of the first imaging tool, the mobile device receives a notification from the first imaging tool that data is available for viewing.

10. The system of claim 9, wherein the mobile device enables viewing of image data from the first imaging tool in response to the received notification.

11. A system for monitoring the operation of at least one object comprising:
a tool configured to generate a first set of data representative of an object, the tool comprising an infrared (IR) imaging tool, and the first set of data including identification data identifying the object and object data representative of at least one property of the object, the object data comprising temperature information associated with the temperature of the object;
a control station in communication with the tool and configured to receive the first set of data from the tool; and
a mobile device in communication with the control station; wherein
in the event that the object data corresponding to the object meets a predetermined condition, the control station communicates a second set of data to the mobile device, the second set of data including identification data identifying the objet for which the corresponding object data satisfies the predetermined condition; and
when the mobile device is within a predetermined proximity of the tool, the tool communicates a third set of data to the mobile device.

12. The system of claim 11, wherein the infrared imaging tool is capable of generating infrared image data representative of a corresponding object such that the first set of data comprises infrared image data, and wherein the third set of data communicated from the tool to the mobile device comprises a live video or a still image of the object.

13. The system of claim 12, wherein the tool further comprises a test and measurement tool configured to generate measurement data representative of at least one parameter of the object such that the first set of data comprises measurement data, and the object data representative of at least one property of the object is based on measurement data from the first tool.

14. The system of claim 13, wherein the tool is configured to process the first set of data to determine if the first set of data satisfies a predetermined condition, and, in the event that the first set of data satisfies at least one predetermined condition the object data comprises alarm data communicated from the tool to the control station.

15. The system of claim 13, wherein the second set of data communicated from the control station to the mobile device comprises infrared image data, measurement data, or alarm data.

16. The system of claim 11, wherein the tool comprises a first tool and the object comprises a first object, and further comprising:
a second tool configured to generate a fourth set of data representative of a second object, the fourth set of data including identification data identifying the second object and object data representative of at least one property of the second object; wherein
the control station is in communication with the second tool;
in the event that the object data corresponding to the second object meets a predetermined condition, the control station communicates a fifth set of data to the mobile device, the fifth set of data including identification data identifying the second objet; and
when the mobile device is within a predetermined proximity of the second tool, the second tool communicates a sixth set of data to the mobile device.

17. The system of claim 11, wherein the tool and the object are located within an enclosure.

18. The system of claim 17, wherein the enclosure is an electrical cabinet, and wherein the tool comprises a test and measurement tool configured to generate measurement data representative of an electrical property of the object.

19. The system of claim 17, wherein the object comprises mechanical equipment located within the enclosure, and wherein the tool comprises a test and measurement tool configured to generate measurement data representative of a mechanical property of the object.

20. The system of claim 17, wherein the enclosure defines an intrinsically safe volume, and wherein the tool comprises an intrinsically safe tool configured to operate safely within the volume.

21. The system of claim 11, wherein when the mobile device is within a predetermined proximity of the tool, the mobile device is capable of controlling the tool.

22. The system of claim 21, wherein, when the mobile device is within a predetermined proximity of the tool, the mobile device is capable of adjusting the field of view of the infrared imaging tool.

23. The system of claim 11, wherein the mobile device comprises a test and measurement tool.

24. The system of claim 11, wherein the tool further comprises a visible light (VL) imaging tool.

25. The system of claim 11, wherein the tool and the object are located in a hazardous volume, and wherein the tool comprises an intrinsically safe tool configured to safely operate within the hazardous volume.

26. The system of claim 25, wherein the hazardous volume comprises an explosive atmosphere.

27. A method for monitoring equipment at a remote facility comprising:
   generating, with a first tool, a first set of data representative of at least one parameter of an object under test, the object under test being located at a first location and the first tool comprising an infrared (IR) imaging tool configured to generate IR image data of the object under test and compare the IR image data to one or more predetermined conditions;
   communicating the first set of data to a remote facility;
   communicating a second set of data from the remote facility to a mobile device, the second set of data being based on the first set of data; and
   in the event that the mobile device comes within a predetermined proximity of the first tool, communicating a third set of data from the first tool to the mobile device; wherein
   if IR image data generated by the IR imaging tool satisfies one or more predetermined conditions, the first set of data comprises information representative of the one or more satisfied predetermined conditions.

28. The method of claim 27, wherein the third set of data comprises IR image data.

29. The method of claim 27, wherein communicating the third set of data from the first tool to the mobile device comprises receiving, via the mobile device, an indication that the third set of data is available from the first tool and accessing the available third set of data.

30. The method of claim 27, wherein the first set of data communicated to the remote facility comprises text-based data indicative of the at least one parameter of the object under test.

31. The system of claim 27, further comprising a test and measurement tool configured to generate measurement data representative of at least one parameter of the object under test; and wherein the first set of data or the third set of data includes measurement data generated from the test and measurement tool.

32. The system of claim 31, wherein the first tool comprises a combination tool that includes the IR imaging tool and the test and measurement tool.

33. The system of claim 27, wherein, when the mobile device comes within a predetermined proximity of the first tool, the mobile device automatically displays the third set of data received from the first tool.

34. The system of claim 5, wherein the first imaging tool is integrated into a combination tool including a test and measurement tool configured to generate measurement data representative of at least one parameter of an object under test; and wherein the at least one other signal in the first set of data representative of one or more characteristics of the first object under test comprises measurement data associated with the first object under test.

* * * * *